United States Patent [19]

Pálmason

[11] Patent Number: 5,505,658
[45] Date of Patent: Apr. 9, 1996

[54] METHOD AND MACHINE FOR PROCESSING FISH

[76] Inventor: Jón A. Pálmason, Hvammshlí 62, Akureyri, Iceland

[21] Appl. No.: 56,073

[22] Filed: Apr. 30, 1993

[30] Foreign Application Priority Data

Apr. 30, 1992 [IS] Iceland ................................. 3854
Apr. 1, 1993 [IS] Iceland ................................. 3854

[51] Int. Cl.⁶ .................................................. A22C 25/16
[52] U.S. Cl. .......................... 452/196; 452/136; 452/161
[58] Field of Search ................................. 452/196, 161, 452/107, 108, 118, 185, 136

[56] References Cited

U.S. PATENT DOCUMENTS

| Re. 33,851 | 3/1992 | Rudy et al. | 452/161 |
| 2,863,165 | 12/1958 | Hartman | 452/196 |
| 4,037,294 | 7/1977 | Cowie et al. | 452/136 |
| 4,170,806 | 10/1979 | Pettersson | 452/154 |
| 4,503,588 | 3/1985 | Palmason . | |
| 5,192,243 | 3/1993 | Weustink | 452/157 |
| 5,226,848 | 7/1993 | Sigurdsson | 452/108 |

FOREIGN PATENT DOCUMENTS

| 42328 | 1/1926 | Norway . |
| 223018 | 10/1968 | Sweden . |
| 305934 | 11/1968 | Sweden . |
| 1118918 | 7/1968 | United Kingdom . |
| 84/03200 | 8/1984 | WIPO . |

*Primary Examiner*—Willis Little
*Attorney, Agent, or Firm*—Merchant, Gould, Smith, Edell, Welter & Schmidt

[57] ABSTRACT

Fish to be processed are moved through succesive fish processing stations located along a predetermined path of movement. The path of movement is defined by a pair of transversely spaced guide rails (4) and the free end parts of the guide rails or pins are inserted through the head of the fish. The free end of the guide rails may, for example, be inserted through the eyes and through the tongue of the fish, beneath the lower jaw bone of the head of the fish and out through the mouth of the fish, through the thin skin of the cheeks along the tongue and through the lower jaw of the fish, through the mouth beneath the tongue and out behind the tongue, through the cheeks and out through the mouth of the fish or through the mouth and out behind the tongue and across square bones of the fish.

46 Claims, 29 Drawing Sheets

METHOD AND MACHINE FOR PROCESSING FISH

BACKGROUND OF THE INVENTION

The invention relates to a method and a machine or apparatus for processing fish, such as eviscerating (gutting), filleting, flattening, cheeking, deheading and splitting heads of round fish, so that it is rendered possible to undertake a plurality of such process steps either in a single processing line or to undertake only one or a few such process steps.

Methods of filleting and flattening fish by means of machinery are known. The known machinery functions in such a manner that the fish is deheaded before it is filleted. This machinery also processes fish in such a manner that the tail fin of the fish first enters the machine. Furthermore, controlling of the cutting of the fish is based on outside measurement of the fish.

Machines for cheeking splitting heads are known, but all guiding means are of a type in which an arm goes up through the mouth and comes out at the nape side, also clearing the gills away. Reference is made to Icelandic patent Nos. 1297 and 1440, the latter of which relates to a method and machine for cutting out cheek muscle bits from fish heads.

Methods for removing tongues from fish heads by hand are also known. A 15–20 centimeters long pin is then fixed to a table. The tongue is stuck onto the pin, the head is pulled away from the pin and the tongue is cut away, the process then being repeated.

Various methods and machines for deheading fish are known, such as machines manufactured by Baader and marked Nos. 427, 410, 161, 162.

SUMMARY OF THE INVENTION

The object of the present invention is to provide a method and a machine for processing fish and rendering it possible to minimize waste of raw material and allowing for a plurality of processing steps in a single manufacturing process. It is also an object to provide a method and a machine in which the fish being processed are effectively guided along a predetermined path through one ore more processing stations so that products, such as fillets, tongues, cheeks/cheek muscles, fish heads and/or flattened fish may be substantially completely processed.

The present invention provides a method of processing fish which are moved through successive fish processing stations located along a predetermined path of movement, and the method according to the invention is characterized in threading each fish on at least one guide rail or pin defining said predetermined path of movement by inserting a free end part of the guide rail or pin through the head of the fish. In this manner, the fish may be accurately guided by the guide rail along the predetermined path and through one or more successive fish processing stations.

It is possible to use only one guide rail or pin. In a preferred embodiment, however, each fish is threaded on a pair of transversely spaced, co-extending guide rails. The free end part of each guide rail may be inserted through any natural openings of the fish head or may be passed through parts of the fish heads. As examples, the free end part of each guide rail may be inserted through an eye and through the tongue of the fish, beneath the lower jaw-bone of the head of the fish and out through the mouth of the fish, through the thin skin of the cheeks along the tongue and through the lower jaw of the fish, through the mouth beneath the tongue and out behind the tongue, through a cheek and out through the mouth of the fish, and/or through the mouth and out behind the tongue and across square bones of the fish.

The invention also provides a fish processing machine comprising guide means defining a predetermined path, means for moving the fish along said path, and fish processing means arranged at successive fish processing stations along said path, and the machine according to the invention is characterized in that the guide means comprise at least one guide rail or pin having a free end part adapted to be inserted through the head of the fish.

The fish processing machine may comprise one or more processing stations. When the machine contains a plurality of processing stations it may be composed by separate units each containing one or more processing stations. As an example, the machine may be made from a combination of five independent units and may then process round fish in such a manner that the fish are eviscerated (gutted), filleted, deheaded, cheeked and tongued.

Because different machine units according to the invention may be combined to form a process line which may perform any combination of the process steps mentioned above, the machine according to the invention is much more flexible than known fish processing machines. Furthermore, the machine according to the invention renders it possible to start with a process line consisting of a few units, and such process line may then eventually be supplemented by further units so that the fish passing through the process line may be exposed to additional processing steps. Because a machine or a processing line according to the invention may expose the fish to all desired processing steps, labour as well as raw material may be saved compared to the use of known machinery, because the fish would have to pass through several of the known machines in order to obtain the same result as that obtainable by means of the machine according to the invention. The guide rail or rails used in the machine according to the invention may guide the fish along the predetermined path of movement so that the fish at any time are in balance, which means that the relative position between knives and other processing means in relation to the fish may be accurately controlled irrespective whether the fish are large or small.

In the machine according to the invention the processing means may comprise plough-like means, for example four ploughs, namely lower ploughs and upper ploughs which are inserted on either side of the length of the backbone of the fish. These ploughs have sharp points, but widen and alter shape from the point and through the rear end. The ploughs are specially shaped to fall in with the length of the backbone and also so that these will push the flesh away from the backbone as they widen. These ploughs may serve a three-fold purpose. Firstly, they may keep cutting knives away from bones, secondly, they may keep the fish straight upon cutting with knives, thus achieving better utilization, and thirdly, they may be used to cut the fish from the inside by means of a special water-cutting. It is also possible to use a combination of knives and water-cutting. The cut which is most common today is one from the outside, but cutting from the inside has not been known previously.

Unlike the machinery currently being used for filleting and flattening fish it is not necessary to adjust the machine according to the invention to the size of fish being processed because of the form of the cutting outfit. The ploughs may be shaped in accordance with the shape of the hollow at the backbone of the fish. The ploughs come apart in accordance with the thickness of bones and along the backbone and lie close to it. The knives thereupon cut up at the ploughs and always manage to cut as near to the bones as possible. Whereas the deviation between thick and thin bones is very slight and actually much smaller than between thick and thin fish, there is much less change when regard is had for the thickness of bones rather than the outside measurement of the fish when cutting is being steered away from bones upon filleting and flattening. It is i.a. for this reason that the utilization of raw material is better in the machine according to the invention than in known machines.

BRIEF DESCRIPTION OF DRAWINGS

The invention will now be further described with reference to the drawings, wherein.

DESCRIPTION OF THE PREFERRED EMBODIMENT

Figure 48:
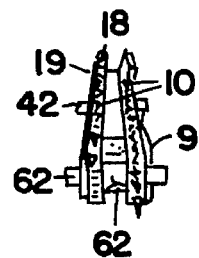
FIG. 48 and 49 illustrate a transporting chain arrangement.

The fish is laid into a channel 37 and the eyes are placed to the sleeves 49 which are attached to steering pins 4. Whereas the sleeves 49 lead backwards along steering pins 4 these keep the setting of the distance away from a prick-chain (FIG. 48) so that the steering fits different sizes of fish. The sleeves can go forward and back by a varying number of centimeters, ranging from 3 up to 30 cm. The sleeves then draw back according to the size of the fish and the prick-chain catches the head and draws the sleeves and thereupon the steering pins 4 through the eyes of the fish and out through the gills or to the side of the gills. The importance of these sleeves is that they have extensive influence on different sizes of fish so that the distance between the pricks where these grip the fish and the end of the sleeve 49 can be variable as previously stated. In the course of processing of large fish this is greater than with the smaller and then it is easier to push the fish to the prick-band, because the sleeves give away and instead of the human hand having to shove the sleeve and the steering pins through the eyes and head the prick-chain does so. The fish has then entered into steering through the machine.

The processing system is variable, depending on whether filleting or flattening is intended or whether or not the intention is to dehead, cheek or tongue. Each sector of processing will be described separately.

When the fish has arrived in the steering the first task is to eviscerating (gutting) the fish. It is possible to choose between two kinds of methods of evisceration. Either water-cutting or the use of a special knife. When water-cutting is employed, a gutting-pin 47 comes inside the belly-fish between the flap bones and water-cutting through the gutting pin sees to the cutting up from the belly-flesh right back to the spawn hole, or where the flesh tightens behind the spawning hole. If a knife 48 is used a gutting finger 47 goes into the fish between flap bones (club bones) and a knife 48 cuts the belly-flesh so that the gutting-finger keeps the belly flesh of the fish up to the knife. A gutting-finger thereupon comes out of the belly at the spawn-hole or through it or to the rear of it where the flesh tightens and therefore presses out the gutting-finger. The fish has then been opened for cleansing of edible entrails.

Figure 32:
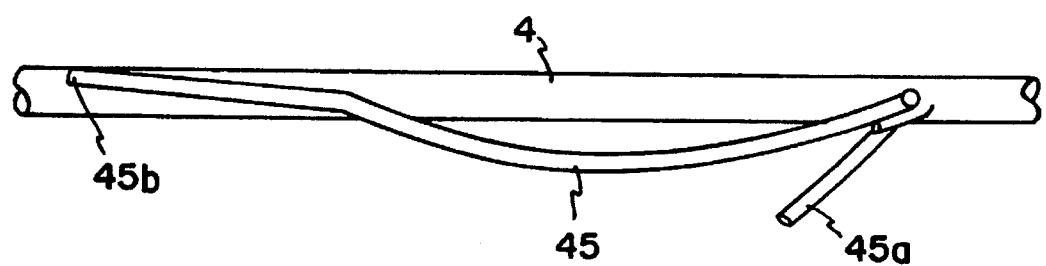
FIG. 32 shows head supporting pins arranged on the guide rails.

The fish is then dragged forward along the steering-pins 4 and the entrails are shovelled out and down a chute 38 with the assistance of moving hooks 44 which grip gills and entrails. The fish then continues and is placed in a chute 39 and the nape-pins 45, which are attached to the steering-pins 4 (see FIGS. 32, 39 and 40), then trust the nape of the fish down as and when the fish is dragged further inward. The nape-pins go through the eyes and the shorter arm of the nape pin 45a then goes down into the nape when a longer arm 45b is drawn through the eyes forward and thrust down to its curved shape so that, as and when the longer arm is pushed through the eyes, the shorter arm on the nape-pin goes down into the nape on the inside and thus presses the fish and the nape downward (FIGS. 35, 36, 39–42). This is also very important when the fish goes up on the ploughs 29 both for filleting and flattening, because the ploughs must touch the nape of the fish so that these penetrate on either side of the backbone. This control is furthermore such that whereas this is on either steering-pin 4 the nape-pin always lands on the selfsame place in the fish, irrespective of size and thus has extensive steering possibilities as it pertains to the position of the fish within the machine.

Figure 1:
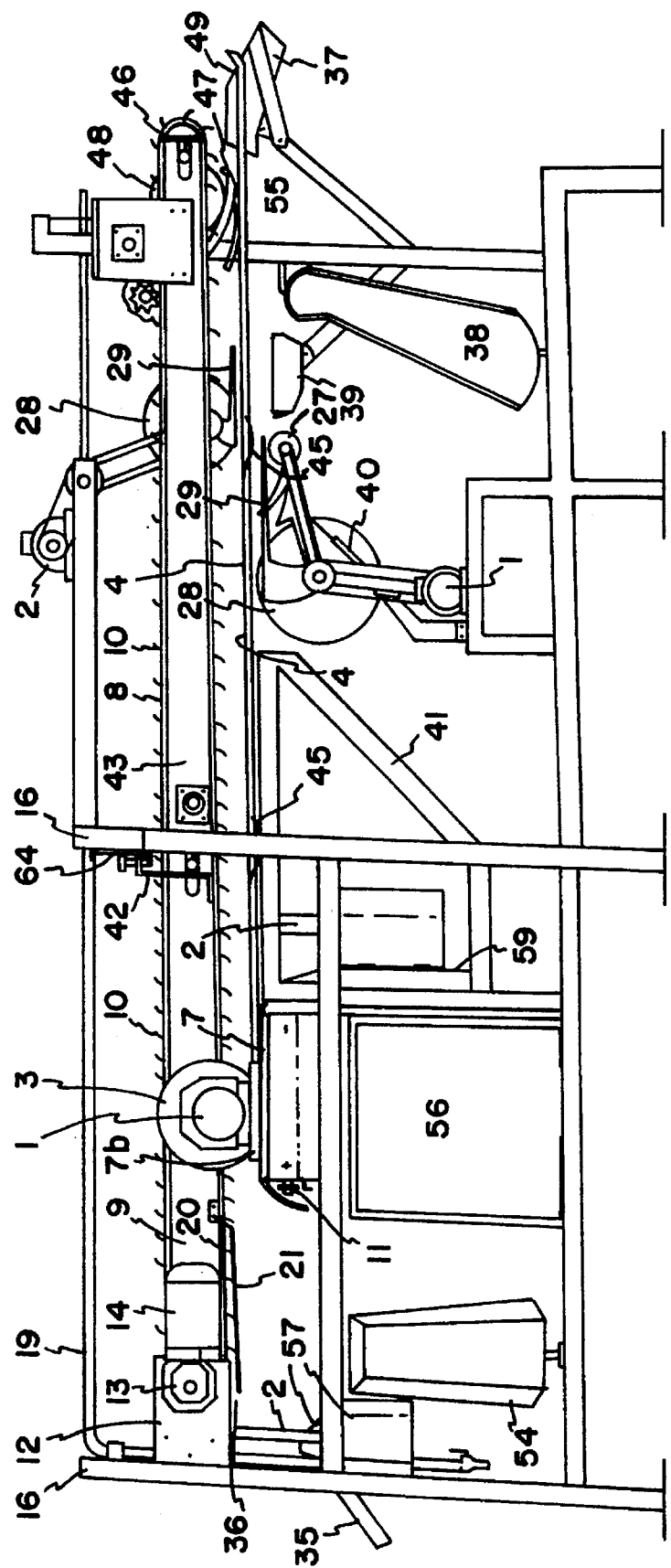
FIG. 1 is a side view of an apparatus or a machine according to the invention.
Figure 2:
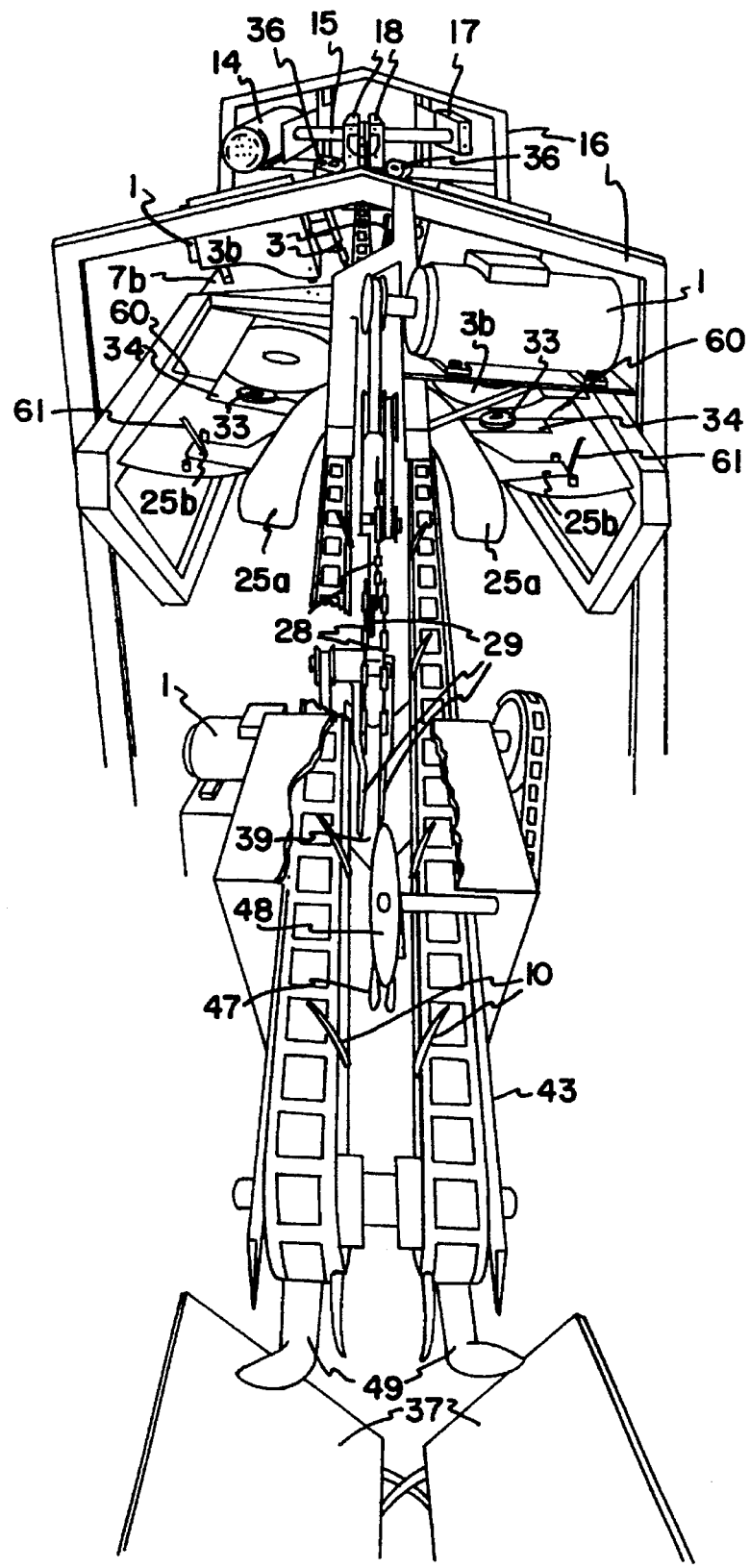
FIG. 2 is a perspective view of the machine shown in FIG. 1, FIGS. 3–8 illustrate various ways of threading the head of a fish unto a pair of guide rails.
Figure 20:
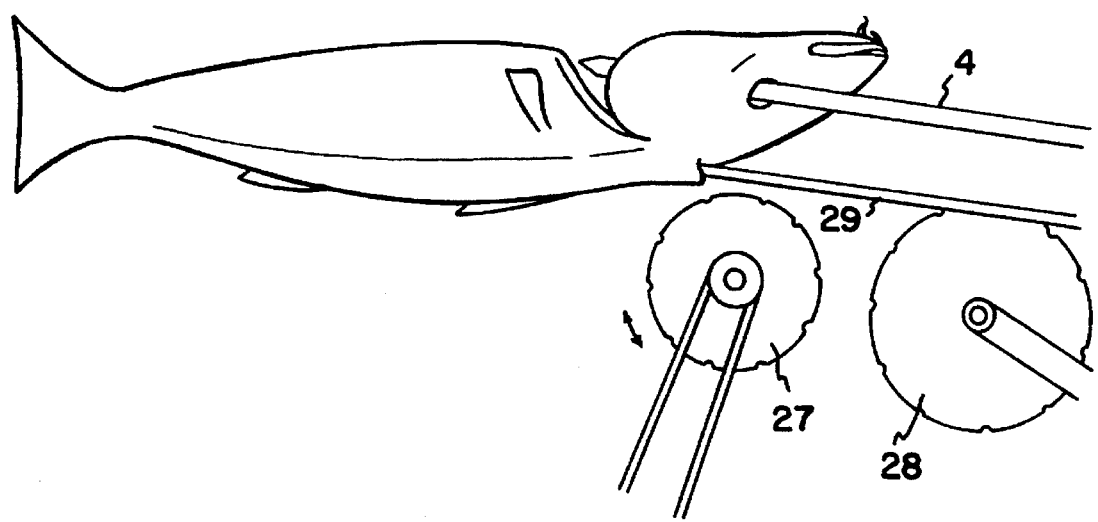
Figure 21:
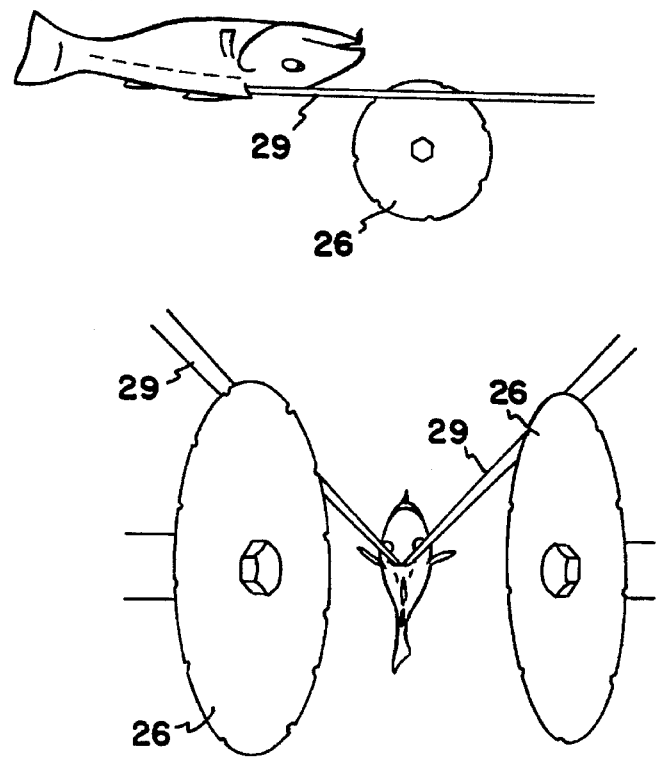
Figure 22:
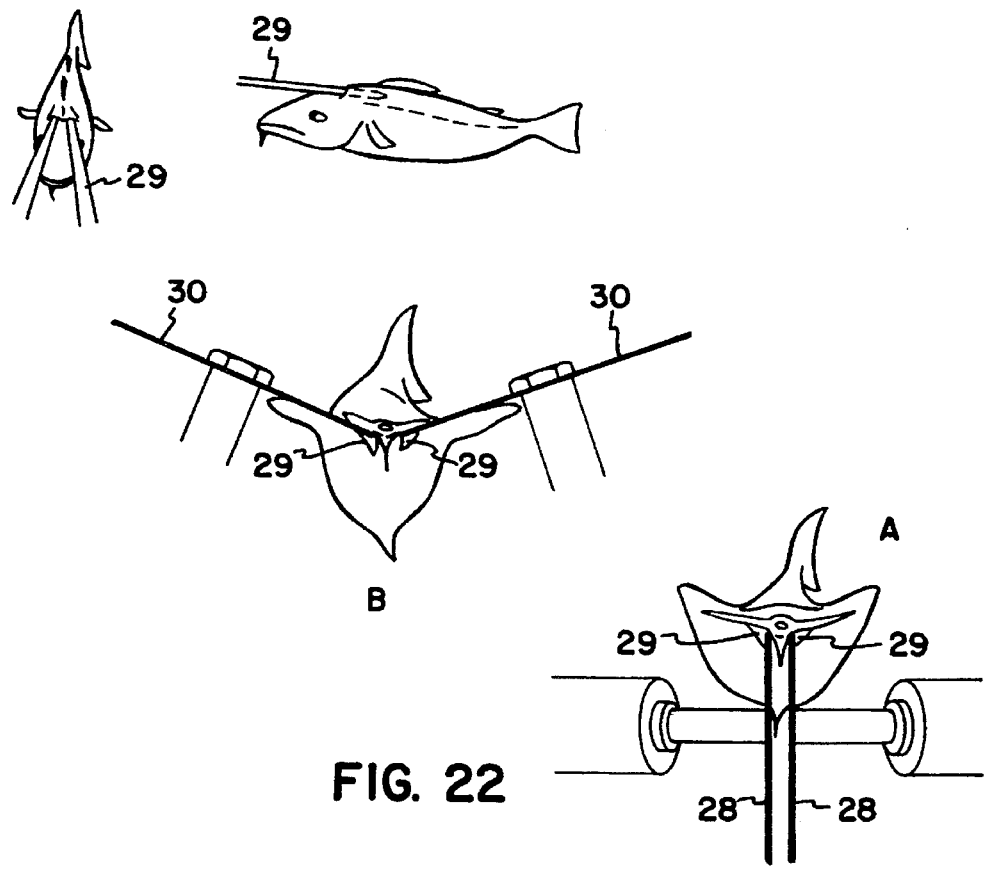
Figure 23:
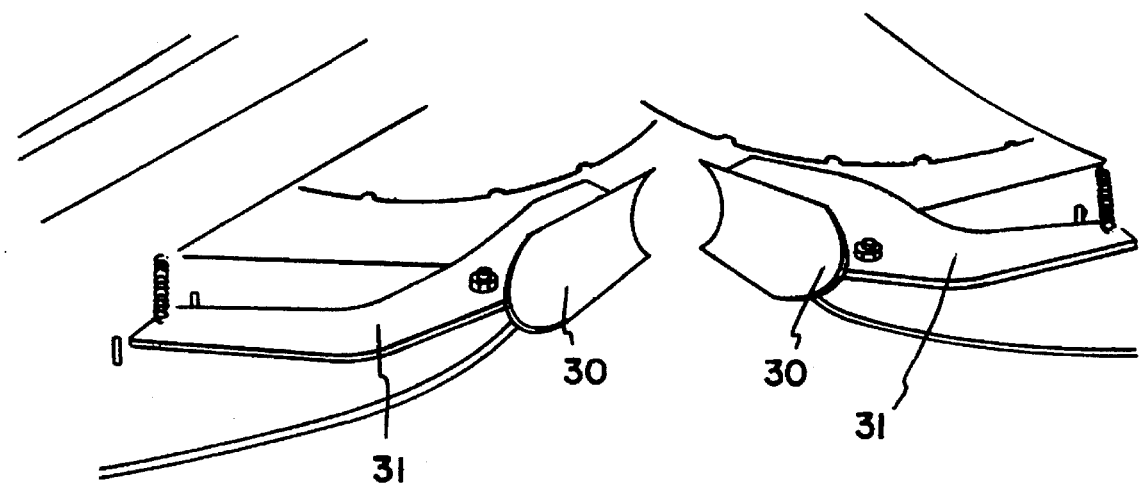
FIGS. 23–26b illustrate means for guiding or steering fish to be processed, FIG. 27 illustrate the free end of a guide rail.
Figure 24:
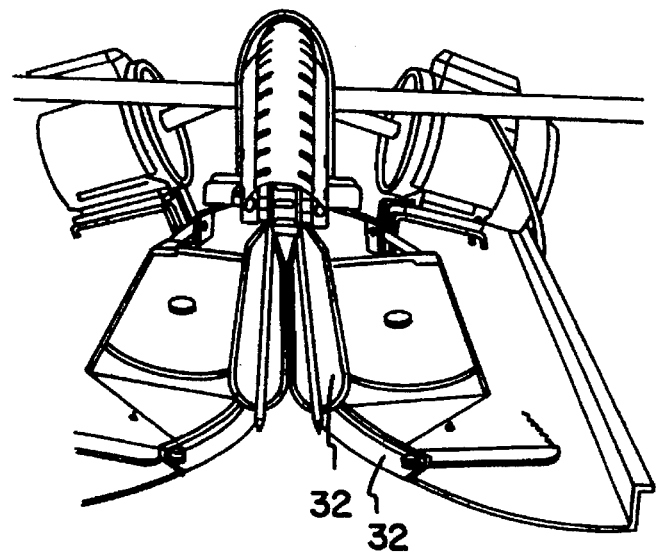

Pre-cut knives 27 cut the fish skin and create an opening for the ploughs 29, (FIG. 20 and FIG. 1). The nape of the fish touches the lower ploughs 29 which penetrate the nape and alongside the backbone at the bottom (FIG. 19, 20, 21, 22 and 44). These ploughs see to it that the skeleton be straight and that the knives 28 which come on to the ploughs will not go into bones and will not cut too far away either. Two knives 28 then cut straight down from the fish alongside the backbone right at the ploughs on the inside, so that the fillets are free from the backbone downward and then to the side and so that the flaps and other parts become detached (FIG. 22 and 45). In FIG. 45 it is seen how the ploughs go alongside the length of the backbone and how these steer the skeleton in between the knives and just the same on the upper part and underneath the belly.

The upper knives 3b then cut alongside the lower ploughs at the top (FIG. 22) so that the fillets are entirely detached from the bones.

The importance of the ploughs 29 is the method under which their shape and length can be variable, on the one hand, according to species of fish, i.e. bone structure, and on the other hand according to the estimated sizes of the fish. This is a finger-shape so that the point is very narrow, but the plough widens on the inside. Thus it may be necessary to change ploughs in the case of processing e.g. redfish (rosefish, ocean perch) instead of cod in order to maintain the same utilization as the shape of the backbone differs.

The fish may be variably fat or loose in texture so that the control of measurement from the outside is not as accurate as when control comes from the bone-size and from inside the fish and the cutting will therefore become much more accurate than it would else have been. When knives are used with the ploughs these cut relatively closer to the bones whereas the ploughs have pushed the flesh which is nearest to the bones, specifically so in the hollow at the backbone. This method has not been employed previously and it's importance is that it is possible to cut extremely different species of fish in the same manner. The fact notwithstanding that fish be of various kinds the machine will meet the requirements of fish processors for a single processing line which can process many types of fish having the same bone-construction and this is therefore less costly as time goes by.

Figure 43:
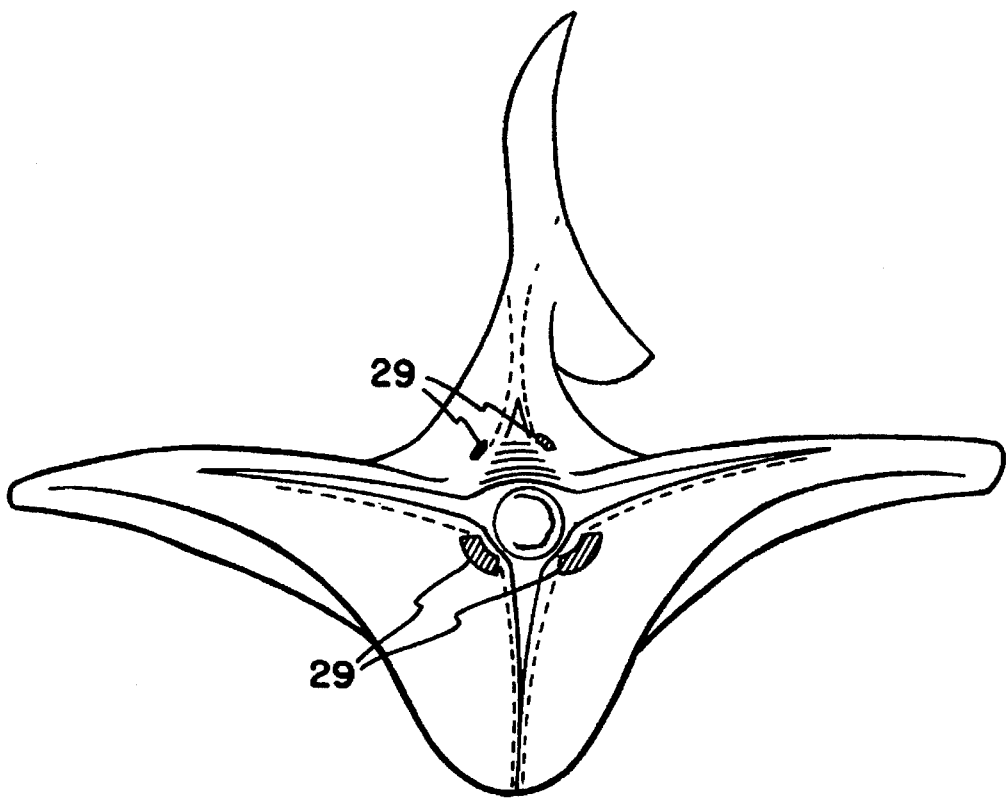
Figure 44:
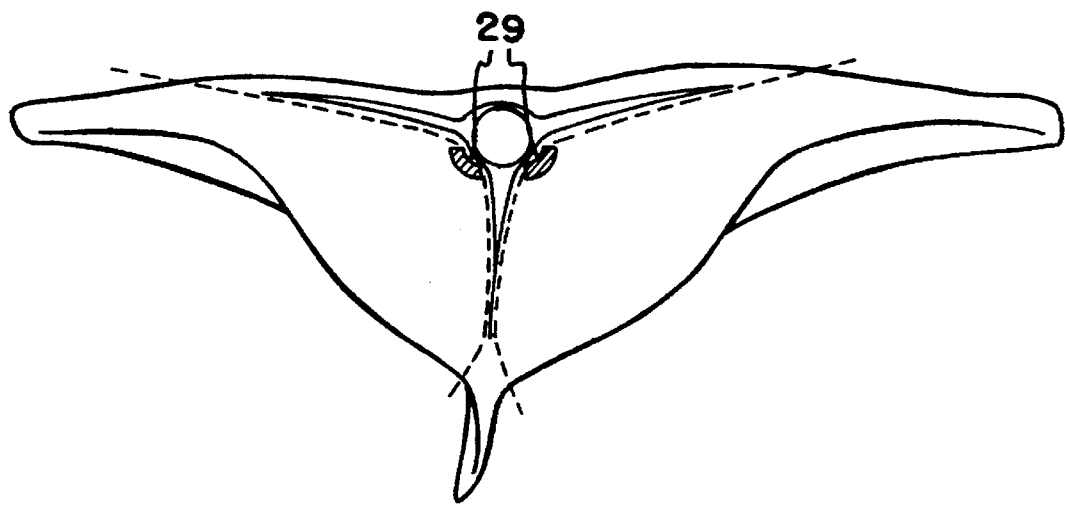
Figure 45:
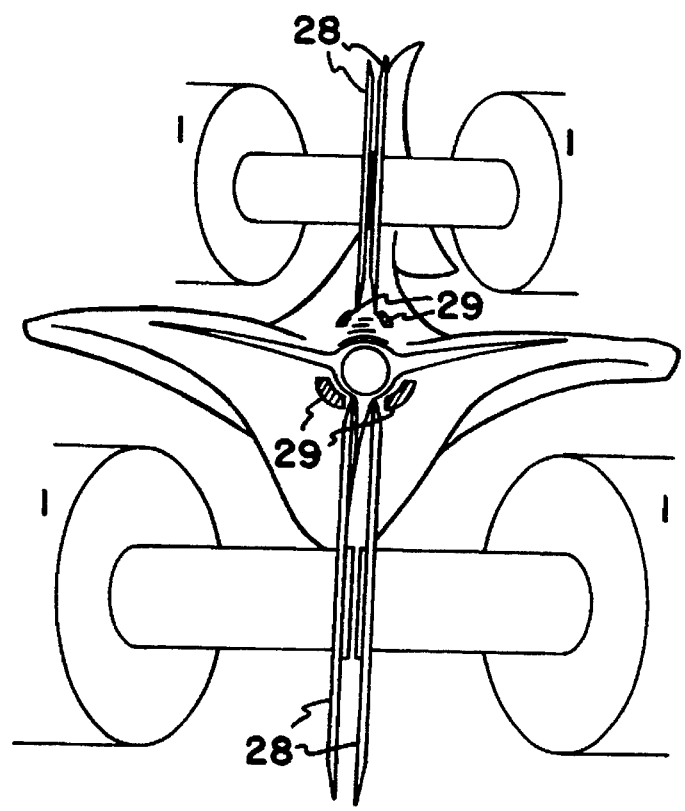
Figure 46:
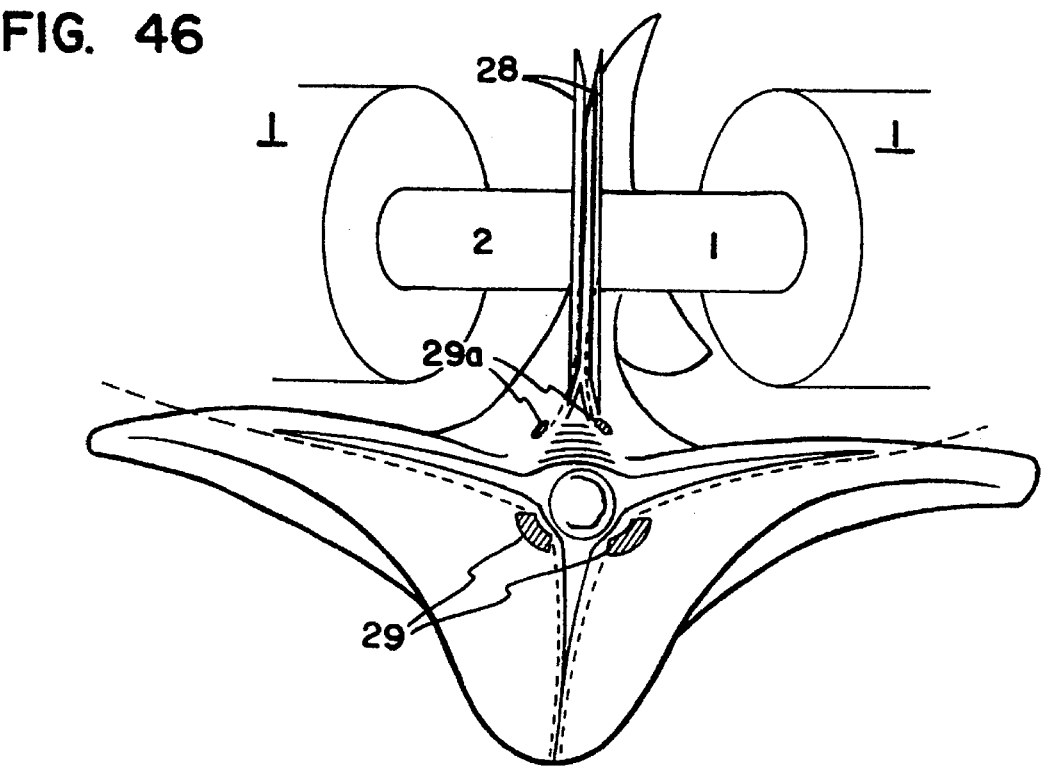
Figure 46:
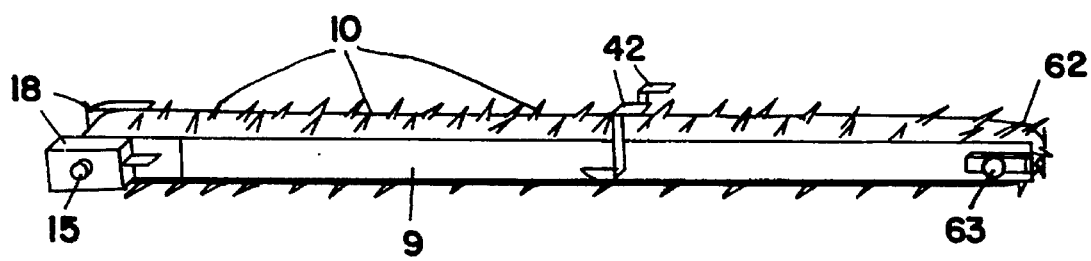

When water-cutting is applied the knives 28 are omitted and the water is conducted through the ploughs 29 and cuts down along the backbones, up along the flaps and back along the length of the back (FIGS. 43, 44 and 46). It is seen in the illustrations how the ploughs lie up in the hollow at the back and the water-flow is marked by means of a dotted line. The water seeks an outlet along the bones and out along the flesh, the clearest way. On the one hand when it has been endeavoured to apply water-cutting from the outside the water has landed on the bones and been trust into the fish, rendering it water-soaked and the merchandise thereby of less value. Therefore this method of cutting the fish from the inside is special and achieves maximum utilization alongside the skeleton without the water, however, being thrust into the flesh and destroying the produce.

On those of the illustrations in which the fish-tail is seen (FIGS. 34, 45 and 46) there are the upper ploughs 29a which lay themselves on the top of the back, going along it and on to the end of the belly-flesh, there comes up the latter part of the back and there the back lies more upward and down in the tail-piece, so that the upper ploughs 29a go there alongside the skeleton and cut upward as shown in the illustrations.

Figure 33:
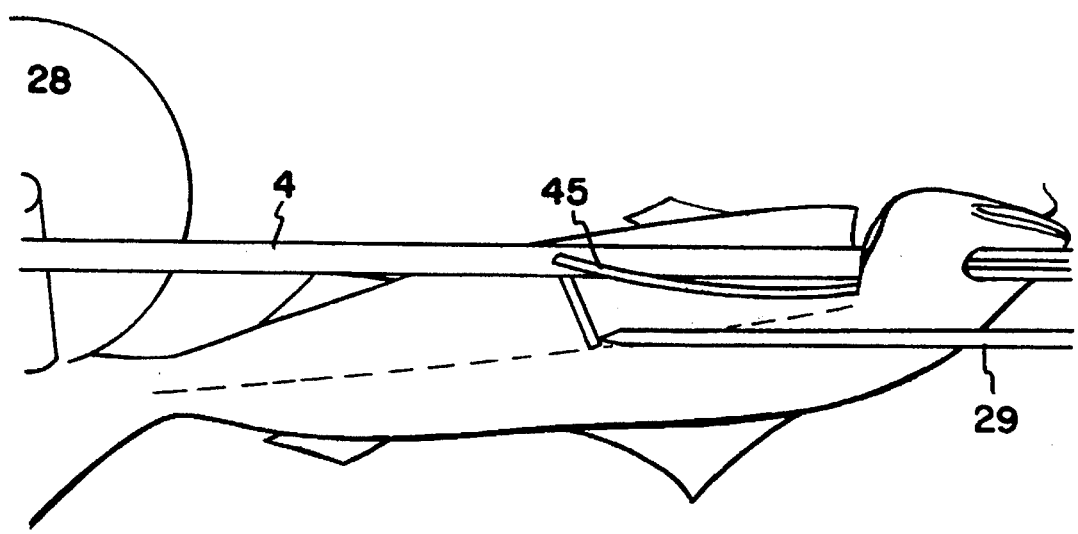
FIGS. 33 and 34 shows a filleting station.
Figure 34:
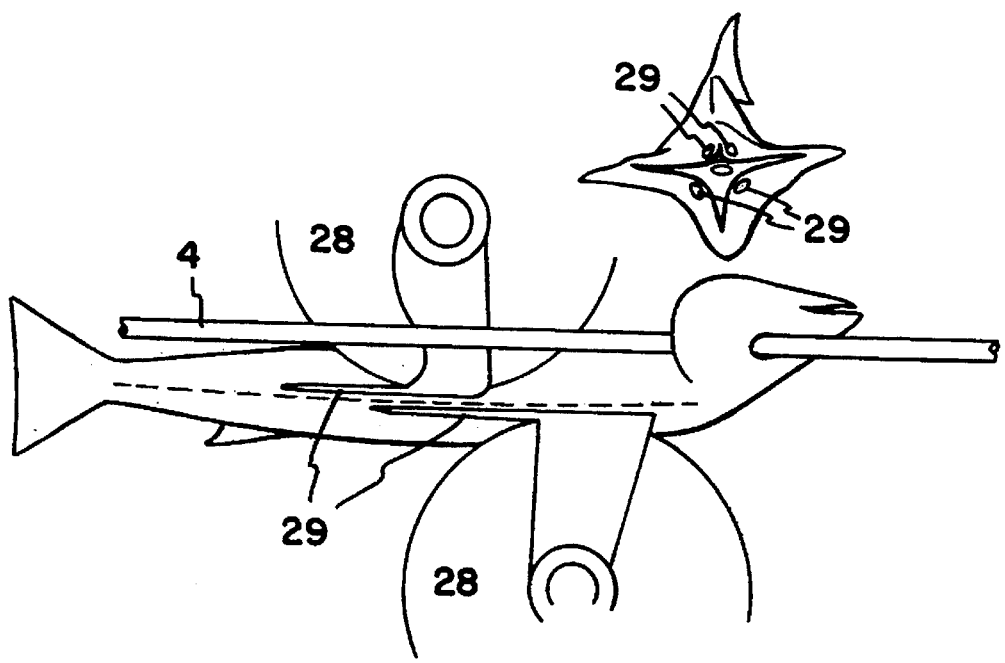
Figure 47:
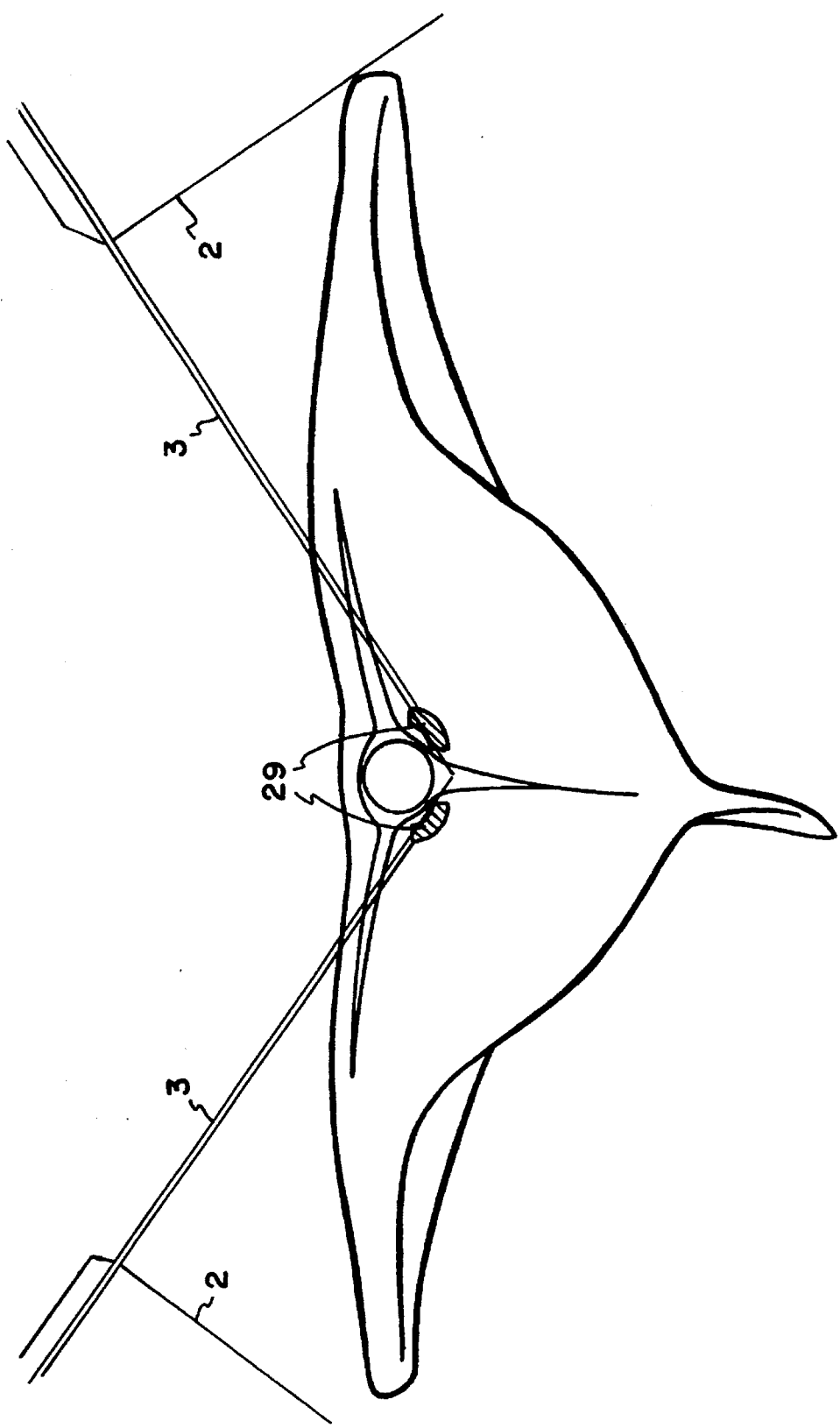
Figure 49:
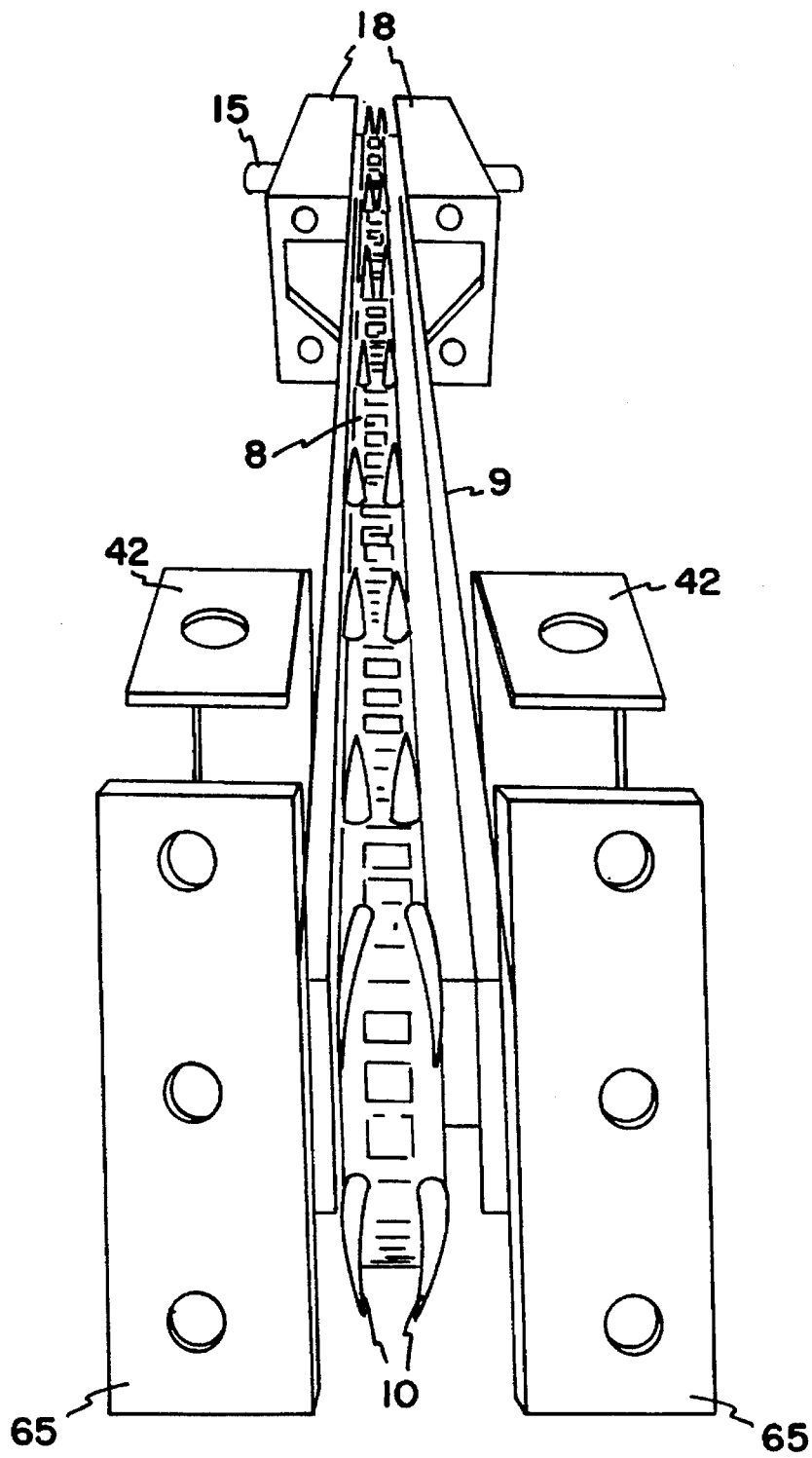
Figure 50:
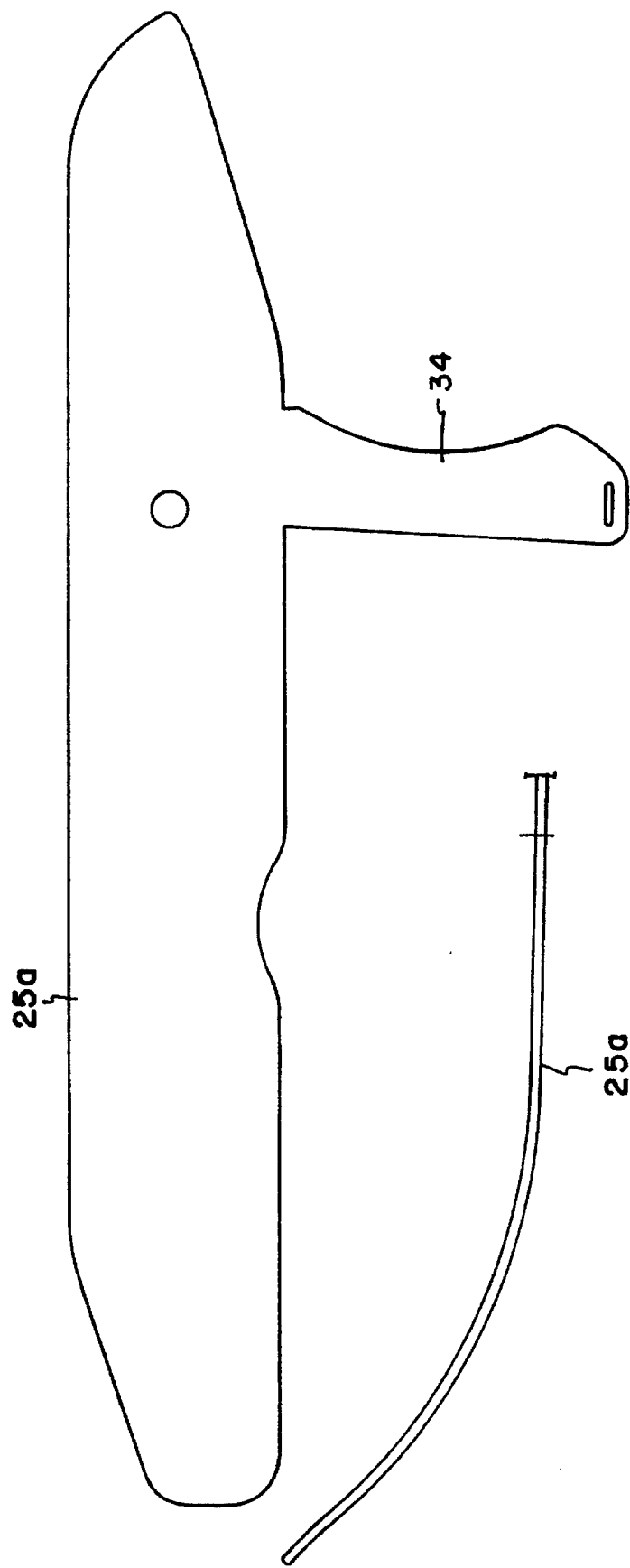
FIG. 50 shows a steering wing.

It is also possible to use water-cutting and knife-cutting jointly (FIG. 46). Then the knives 28 are applied as previously described along with the ploughs with the water-flow The fish is laid on to sleeves 49 and enters the machine in the same manner as usually with a spike-band and drive-arm. It goes along steering pins and then one knife only is used in the upper cutting combination 28 motor 1 and the upper plough on the same side 29a, because from the spawn-hole and back to the fish-tail cutting is to occur only on one side of the back as is practiced in conventional salt fish processing as the skeleton behind the spawn-hole is attached to flattened fish. Therefore the upper knife cuts from the spawn-hole and all the way back on one side of the length of the back. The nape-pins 45 are considerably longer in this instance or a longer arm b (FIG. 33) which pushes the back down when it enters the upper ploughs 29a so that at the spawn-hole it pushes the length of the back actually down below the lower ploughs 29 (FIGS. 33 and 34). The lower ploughs have previously gone on either side of the length of the back on the nape-side in the fish and the knives have come into the same position as in a deheading combination, so that these cut the back asunder behind the spawn-hole and whereas the back has been thrust down below the lower ploughs it is not cut asunder, but the cutting ends on the lower plough as the back alters shape off the spawn-hole (FIG. 46). The knives cut through a rift (hole) on the ploughs, so that cutting occurs with the same knife on both sides of the ploughs 29 and the back is cut under (FIG. 47). Thus the back it cut from the nape and back to the spawn-hole away from the fish, but is fastened to the head. In another respect, the continuation of the processing in heads, cheeks and tongues is in the same way as previously described (FIG. 22 and 33). In FIG. 33 it is seen how one plough 29a and one knife 28 have completed cutting on one side throughout on the belly flesh side and then it is seen in FIG. 22 and 47 how the back, still being fixed to the head, is cut away from the flesh.

Figure 53:
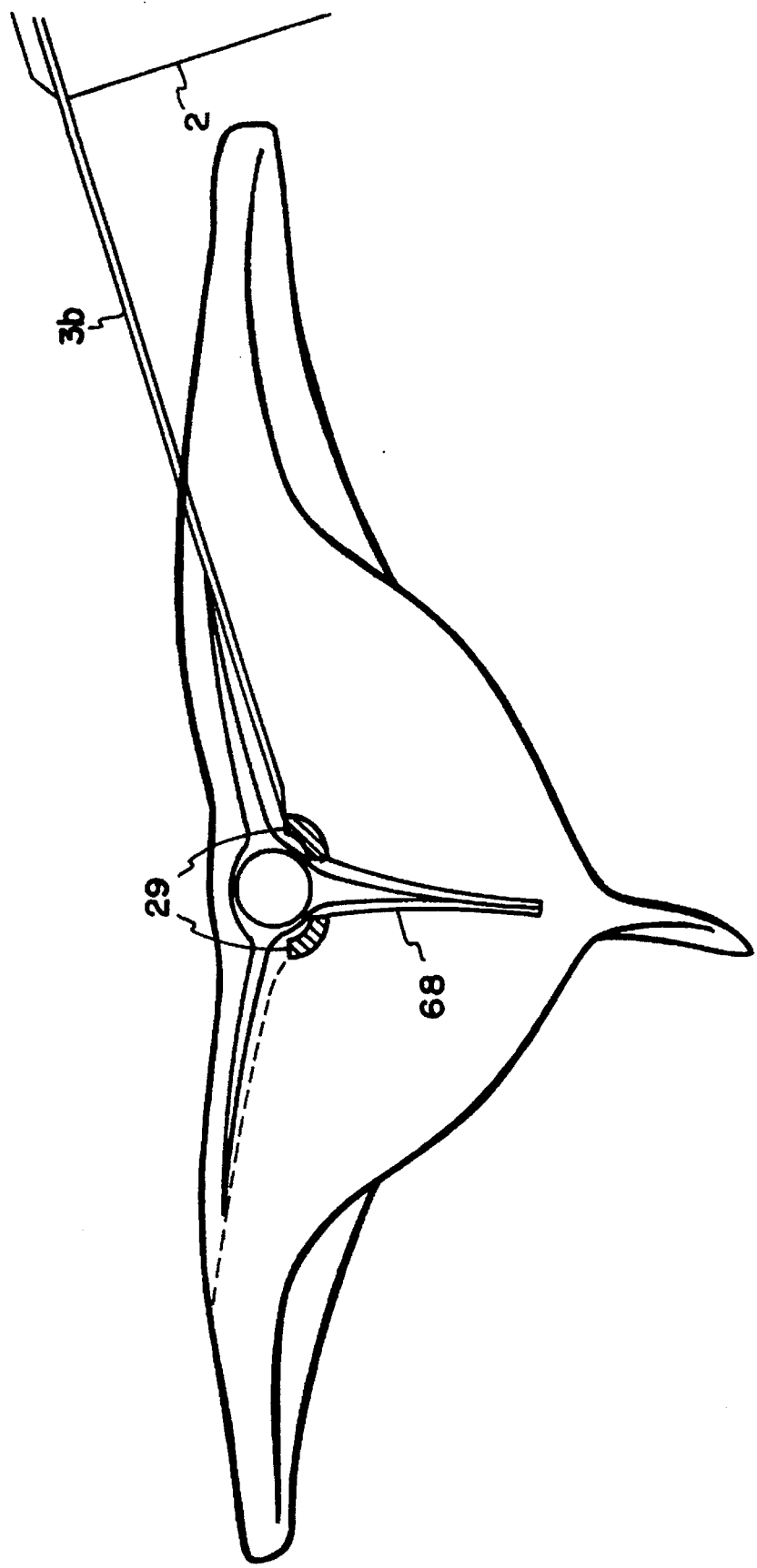
FIG. 53 illustrates a further embodiment of a filleting means.

In flattening without backbones the fish is laid into the machine as previously described except for the fact that there are two upper ploughs and two knives cut on either side of the length of the back at the top. In the lower ploughs there is only a cut up from the ploughs, but not down from these. Instead of a cut through the back there comes a loop over which the back goes and this cuts or tears the bone away from the flesh so that the fish remains intact (whole) thereunder (FIG. 53).

Figure 35:
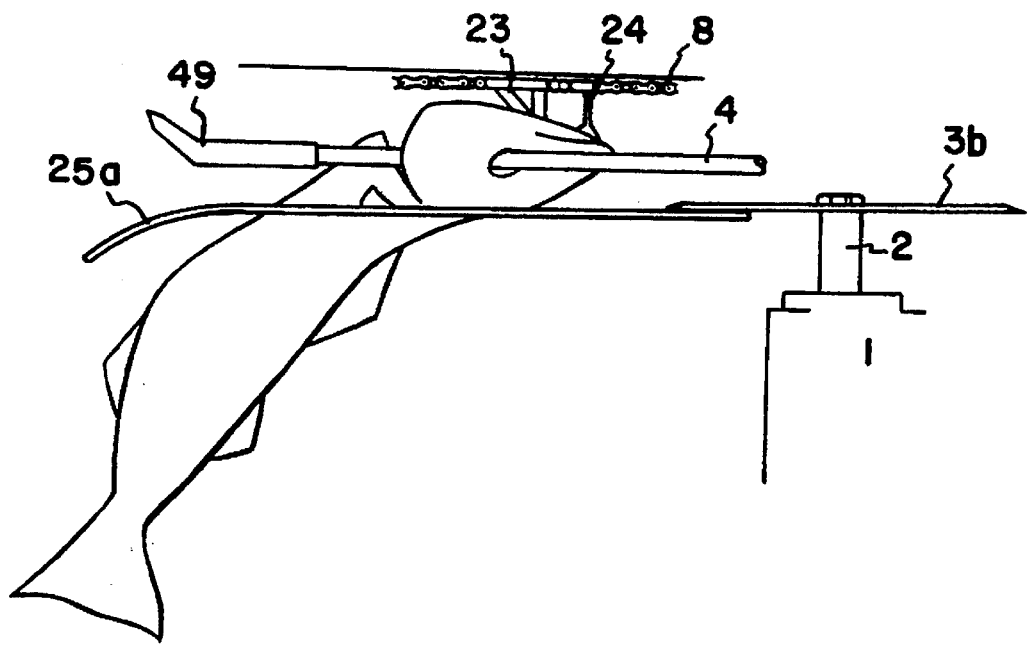
FIGS. 35 and 36 illustrate threading of a fish on the free end of the guide rails.
Figure 36:
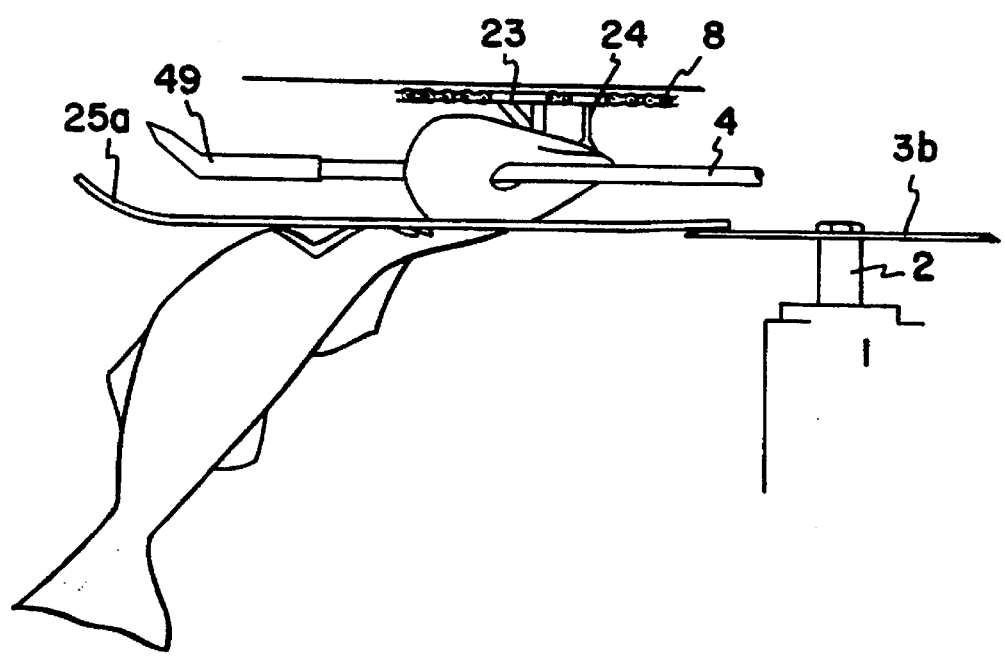
Figure 37:
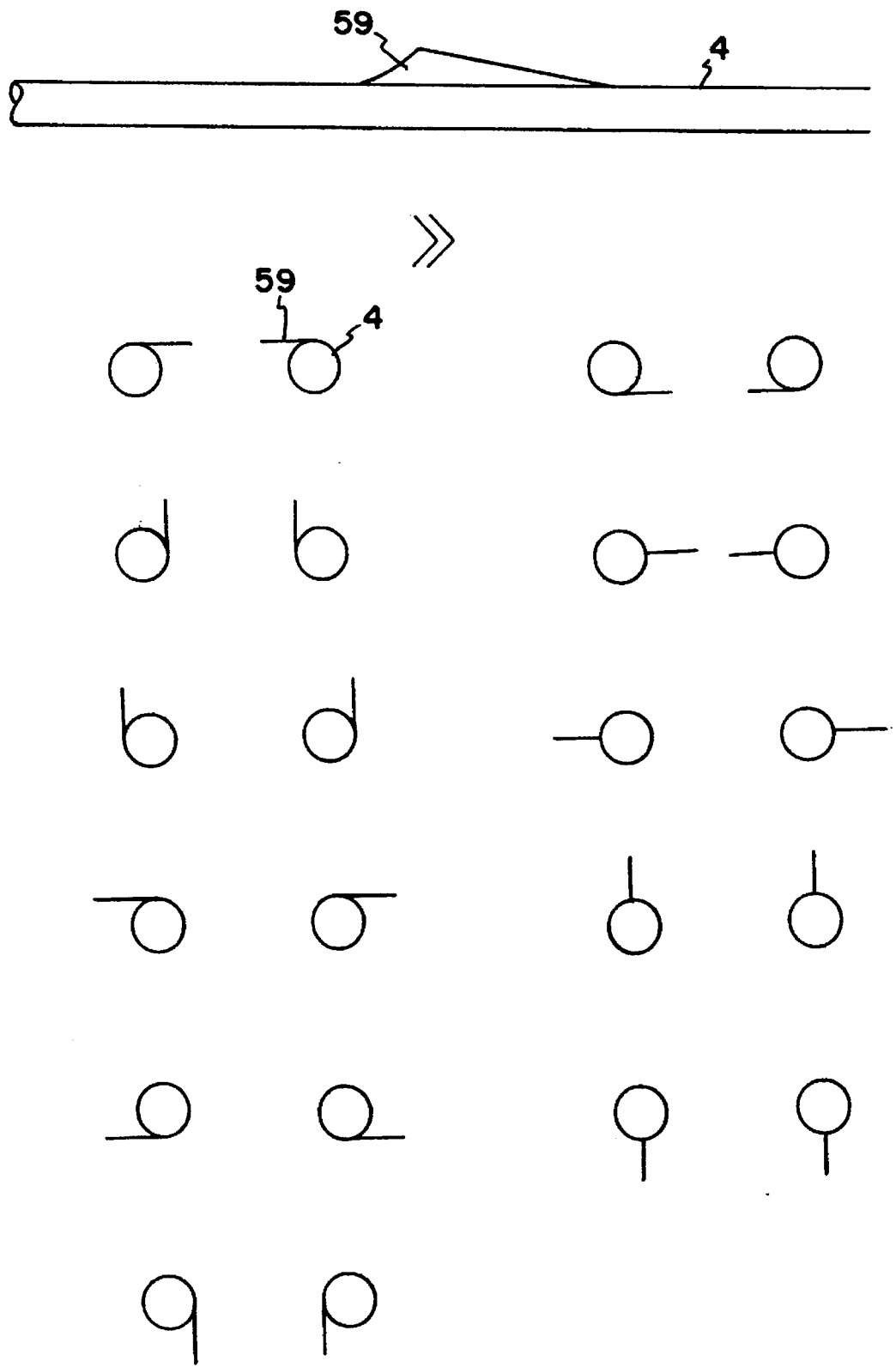
FIG. 37 illustrates various ways of mounting fixed knives on the guide rails or steering pins.

Cutting at the head is performed when the fish is drawn forward into the steering wings. The steering wings 25a, 25b and 25c lay themselves up to the fish and a levelling arm 34 ensures that the fish is laid straight before the knives, irrespective of whether the fish is small or large or whether deheading is being performed prior to filleting or flattening (FIGS. 35–36). The fish then continues along the steering pins and to the head cutter 3B, 25A, 25B and 34, (FIGS. 25B and 26B). Off the position in which the steering-wings and the knives meet there are nape-pins 45a and 45b which push the nape down so that the deheading knives cut the fillets away with the best possible utilization. The nape-pins are very important, because in the machine according to the invention there is an inclination of the deheading knives 3 different from that previously practiced, and inclination which functions to the effect that it renders it possible to cut the fish alongside the nape, its shape notwithstanding, without getting involved in bones as the inclination of the knives is similar to that of the head-shell (FIGS. 35 and 36). Thereafter, the nape pin 45a pushes the fish itself down below the knives when the nape is cut at the head-shell. In comparison with the inclination of knives in known deheading machines the inclination of knives in the machine according to the invention is absolutely contrary to e.g. Baader 427 based on the disposition of fish. Despite this fact much better utilization is obtained in the cutting and that is one of the principal aims of the invention.

Flap-bones lie above or underneath, depending on whether or not these are to accompany the fillet (FIGS. 35 and 36). the head then continues as a special knife combination 1, 3, 7 and 7b removes the cheeks from the head and then the head continues along with the back into a gilling combination. The processing of tongues and cheeks will be described in detail hereinafter.

The fish is placed on sleeves 49 and then the chain drags it up to the steering pins. The chain hooks up variably, depending on whether or not tongueing is to occur. If tongueing is to occur a grip-lock 24 will go behind the mouth-bone and then a tongue-grip 23 comes underneath the tongue where these lock together 23 and 24 and drag the fish forward into the machine so that an arm 47 from the eviscerating knife 48 comes underneath the belly-flesh. This arm goes out of the spawn-hole or behind the spawn-hole owing to the tightness of the flesh. Above the arm there is a knife 48 which cuts the belly-flesh, or a gutting-finger, depending on whether or not water-cutting is being applied. Then there come arms 44 protruding from the steering-pins which hook into the gills so that these are torn and cut away and the entrails accompany the gills and all this falls into a chute 38. The fish is then conveyed to steering-wings 25 and 25b. The shape of the wings depends on whether the fish is to be deheaded for salting or filleting. If deheading is to occur for filleting, the flap-bones are laid on top of the steering wings (FIG. 35) which lie right underneath the knives 3, so that the nape is cut away very well and the steering-wings keep flap-bones so tight up to the knives that the flap-bones land above, but the fish without flap-bones lands underneath the knife and the fish is then cut in such a manner that the head continues along with flap/club-bones and goes top cheeking and tongueing (FIG. 35). If, on the other hand, the intention is to dehead before flattening, the fish is laid in. the same manner in the steering, except for the club-bones which are placed below the wings so that when the fish is dragged forward it goes along the steering-wings. The wing-end is then variably placed above or beneath the knives, depending on how near to the nape cutting is to occur, so that the club-bones land beneath the knife and consequently accompany the torso of the fish (FIG. 36). The head then continues for cheeking or tongueing without club-bones.

Figure 25A:
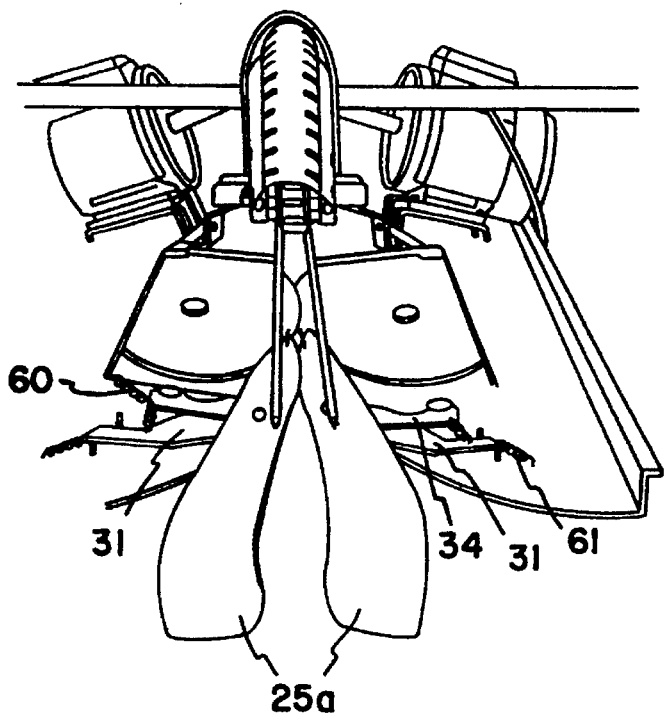
Figure 25B:
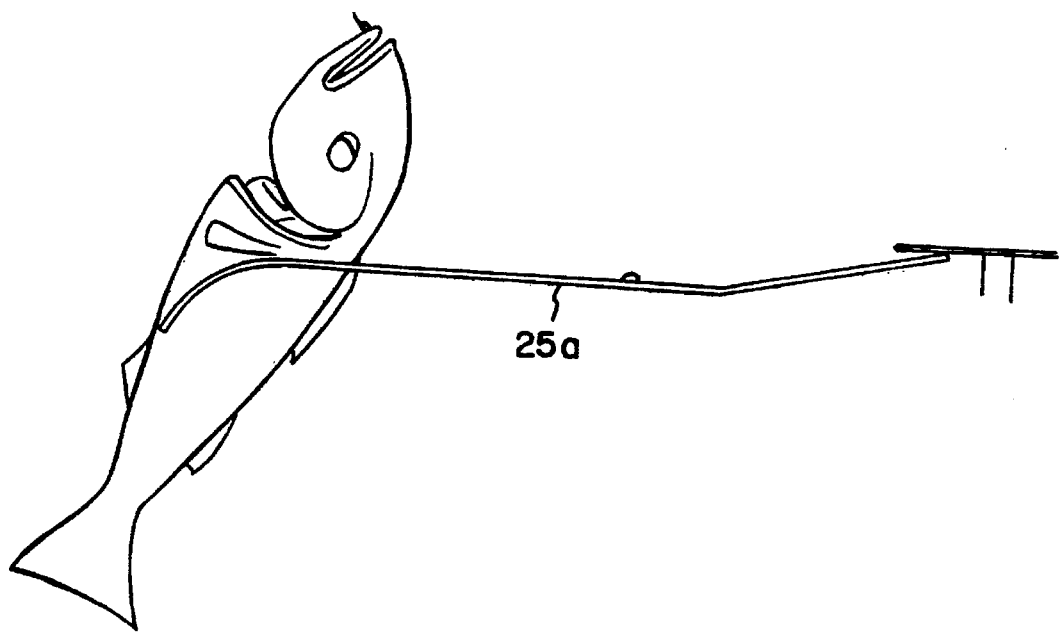
Figure 26A:
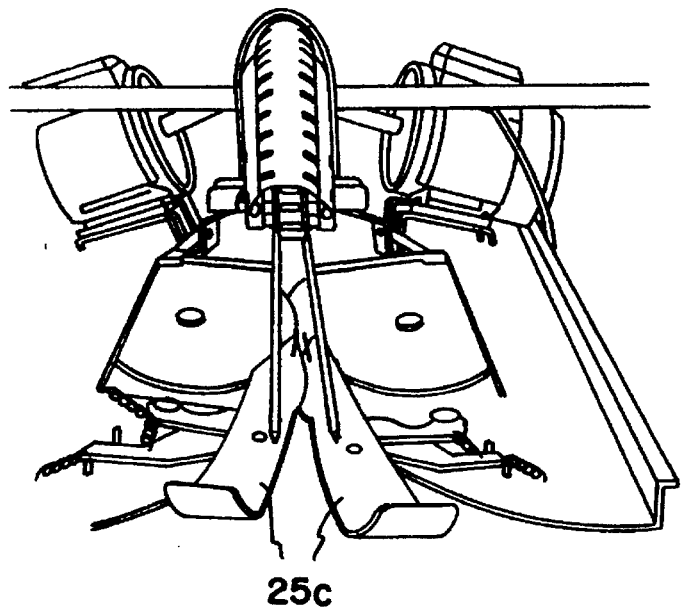
Figure 26B:
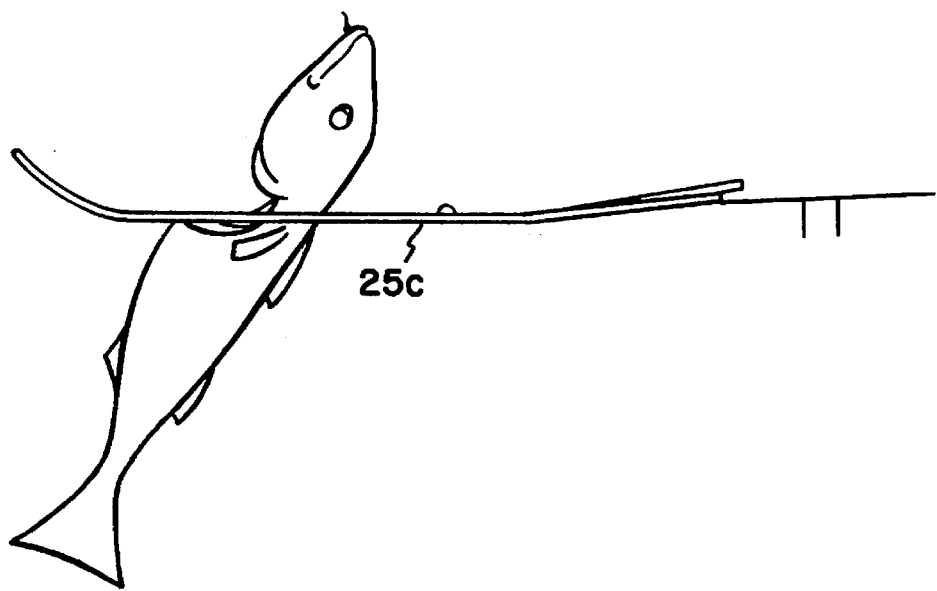

That which makes the feeding steering a specialty is the fact that it is based on that on either side there are steering wings, i.e. underwings and overwings (FIGS. 25a and 26a). The underwing 31 keeps the upperwing 25a–25c up to the fish and from the upper wings there is a levelling arm 34 coming up to a levelling arm bearing 33. Levelling arms 34 which are linked to the steering-wings steer the balance of the steering-wings and this has a considerable effect on al sizes of fish fitting the head-cutter. The shape of these levelling arms is to the effect that when the fish opens up the steering wings owing to its size, specific pressure is always maintained on the fish so that if clubs have been placed on top of the steering wings these will not go underneath and if these have been placed underneath then these will not go up. Springs 61 which are fixed to the lower wing 25b along with a spring 60 filed to the levelling arms 34 make the pressure necessary to hold the fish level by means of steering wings. Thus, the steering wings control as to whether the club will or will not come along upon the cutting (FIGS. 25b, 26b, 35 and 36). It is irrelevant whether the fish is large or small, because the balance between the steering wings is always in complete conformity whichever side of the fish the steering wing lies. The fish is therefore at all times in the centre vis-a-vis the knives. The fish is dragged forward and nape pins 45a and 45b push the nape down (FIGS. 39 and 40), so that the head is cut tight to the head-shell as stated above. Thereupon, the head goes into the cheeking combination.

Figure 38:
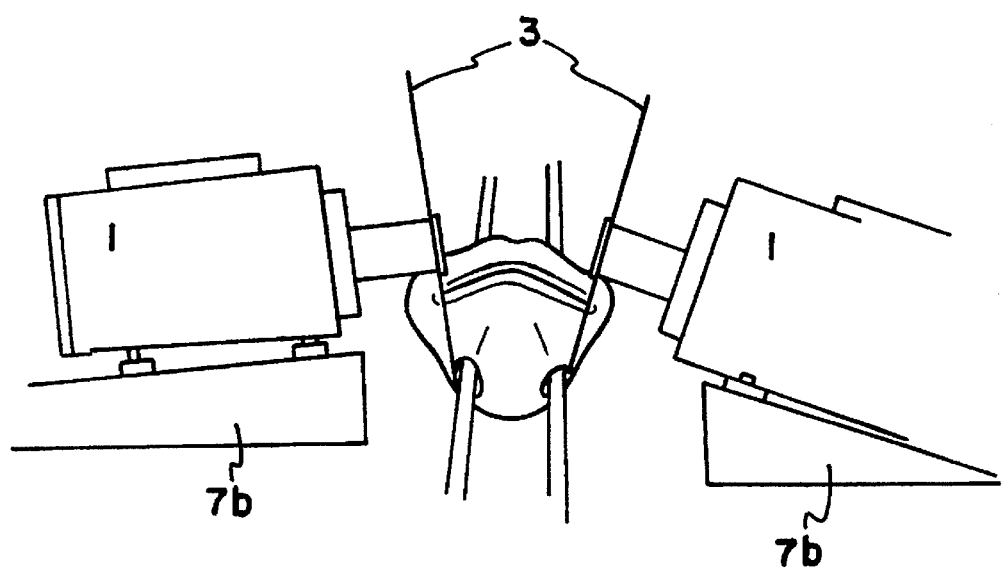
FIGS. 38–40 illustrate cutting of the head shell and cheeks from the head of a fish.
Figure 39:
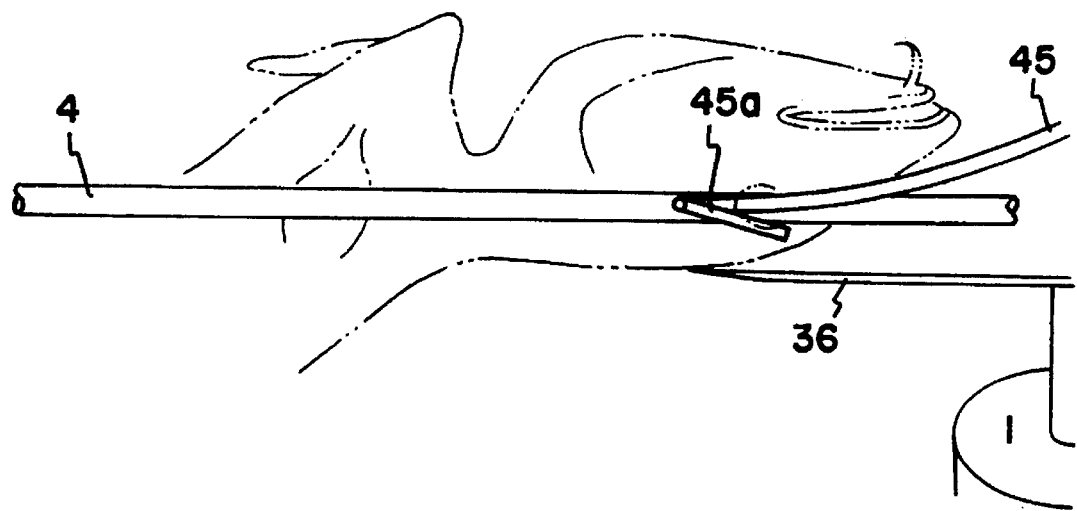
Figure 40:
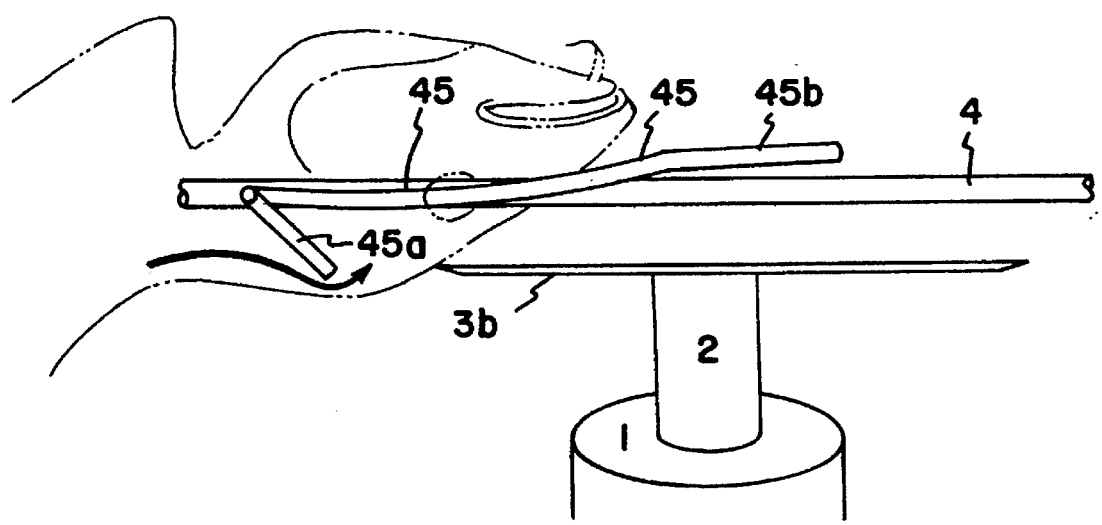
Figure 41:
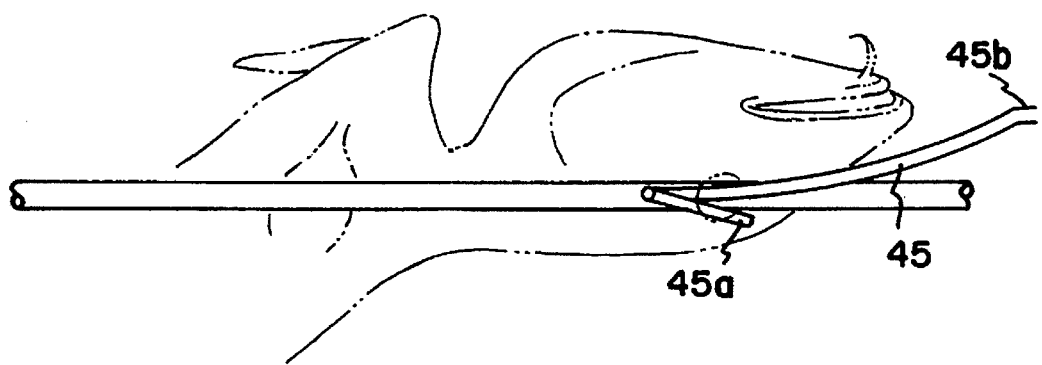
FIGS. 41–47 illustrate filleting of a flattened round fish.
Figure 42:
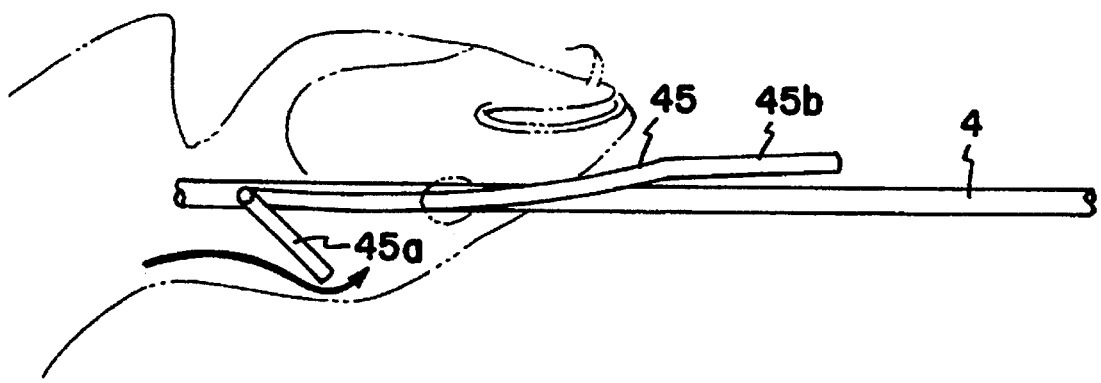

The outfit of the machine which cheeks (removes the cheeks of) the fish consists of two electric motors 1, shafts 2 and knives 3. The electric motors stand on platform pieces 7 and 7b which are on bearings or connected shafts 6 so that the motor combination on either side of the fish can come aside, depending on the size of the fish. When the head comes after the steering-pin 4 the motors come apart and together according to the size of the fish. This leads to the cut always being even on both sides and it is irrelevant as to whether the head is large or small (FIGS. 11, 12, 13 and 38). The inclination of the knives is variable depending on how the cheek-cutting is to occur and on which side the steering pins are placed at the knife. It is possible to let the steering pin lie on either side of the knife so that if it lies inside of the knife then proportionately more is cut from the cheek, but if it lies outside thereof less is cut form the cheek, all depending on the inclination of the knife. It is even possible to cut entirely forward at the jaw-bone (FIG. 38). Its is possible to have the cheek very small so that there will practically merely be a case of the muscle and the shell thereunder. This is of great importance as there are variable requirements in markets concerning the shape of cheeks. Different requirements are also made for cheeks intended for salting and cheeks to be frozen. A fish processor may therefore adjust the production to these different requirements without additional investment.

Motor levelling arms 11 proved for the disposition of the motors being at all times internally even, i.e. in case one of the motors shift out, the other one will also shift out so that there will always be even balance and the head is evenly cut on both sides.

If the cheek muscle is to be removed without bones, an eye-hook 50 (FIG. 30) is used and this hooks into the eye and opens it for a muscle-pin 51 which comes in underneath the muscle and between flesh and bone in the cheek. When a conventional knife is to be used in the cutting as previously described, the muscle-pin 51 goes longitudinally along the cheek-bone 51 and the cheek-bone lands between the steering-pins 4 and the muscle pins 51 which keep it entirely away. The muscle then lands on the other side of the knife and is cut away.

It is also possible to cut the cheek-muscle away by means of water (FIG. 30), but then the muscle pin 51 is water operated, i.e. water is conducted through that part which sticks in between the muscle and the bone and the water thrusts the muscle away from the bone and cleanses the bone considerably better than is possible by means of a conventional cut. Thereby the muscle is better separated and cleaner. There is, on the other hand, a hazard at hand to the effect that the water will spit from the bones into the muscle, but whereas this is a very short distance there is not a great danger thereof as there is a direct route back and along the bones out from the cheek-piece.

Figure 15:
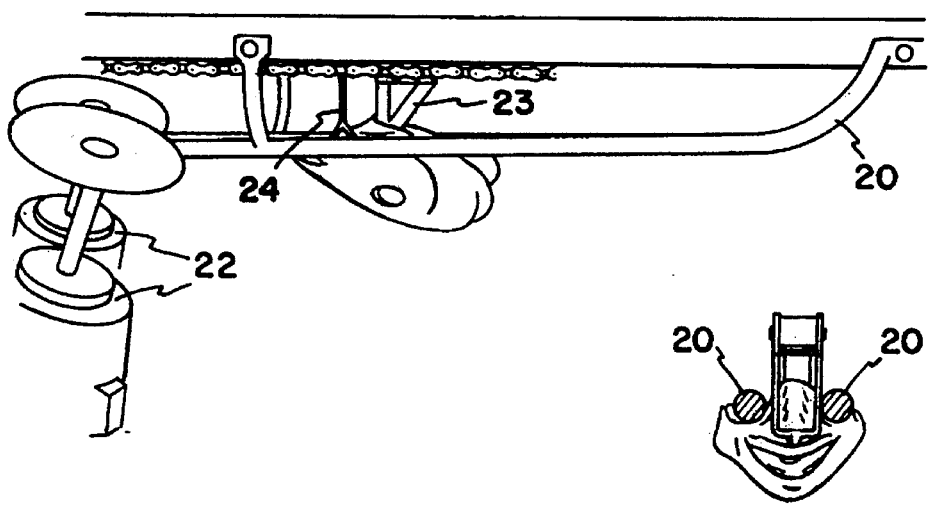
FIGS. 15 and 16 illustrate a station for cutting the tongue from a fish head.
Figure 51:
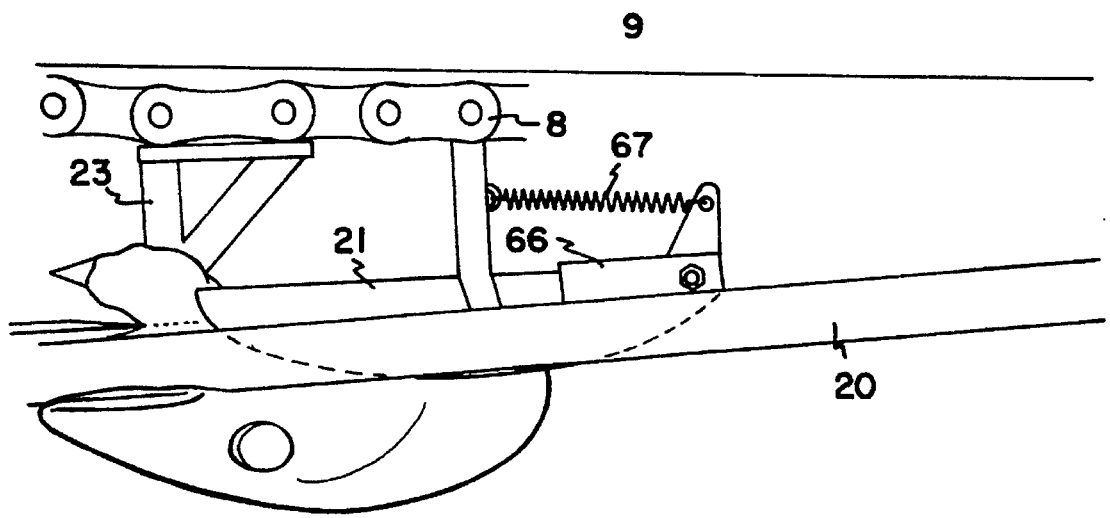
FIGS. 51 and 52 illustrate a processing station with a tongue blade.
Figure 52:
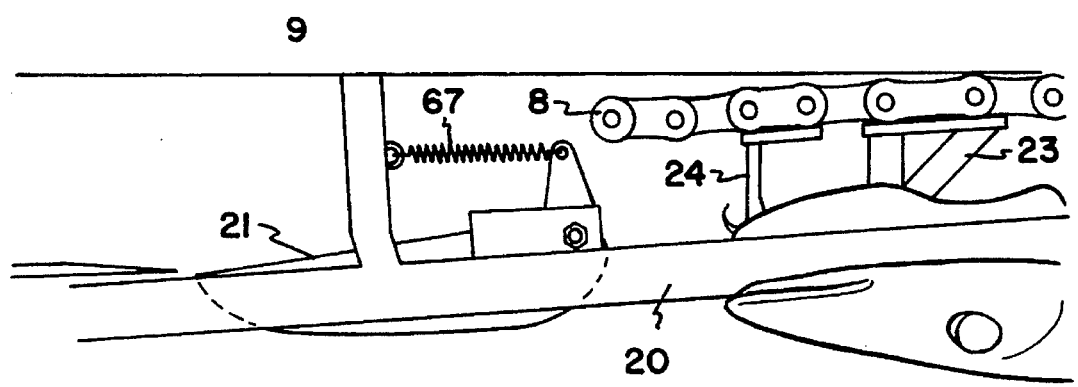

After the head has been cheeked of it goes on for tongueing. The head goes beneath a tongueing-sledge 20 (FIGS. 15, 51 and 52) where the tongue is fixed in a tongue-grip 23 and a grip-lock 24, and then the tongue is pulled beneath a tongue-sledge 20. A steering-blade 21 pushes down and keeps down the mouth-bone and lip and bones behind the tongue (FIGS. 51 and 52). The chain then goes over the knives 36 and the tongue is cut away 17, 18 and 20. When the chain starts going into a driving wheel the intercept between the grip-lock 23 and the tongue-grip 24 increases so that the tongue is detached and falls into a tongue-chute 35. What is left of the fish then falls into a chute.

The invention comprises the following features separately or in combination:

A fish processing machine which eviscerates (guts), fillets or flattens fish, cheeks and tongues by the fact that the machine is composed of five units:- (a) a unit which cheeks, tongues and detaches cheek-muscles with the bone, (b) a unit for deheading, (c) a unit eviscerating (gutting), (d) a unit which fillets, (e) a unit which flattens.

A fish processing machine in which the fish is steered through the machine by means of steering-pins 4 and upon cutting four ploughs are used, upper ploughs 29a and lower ploughs 29, both for the purpose of controlling the cutting and to cut the fish from the inside by means of water upon filleting and flattening. It is also characteristic for the fish processing machine that it is possible to use each individual unit independently for deheading, checking and tongueing, filleting or flattening (FIGS. 3 and 4).

Figure 3:
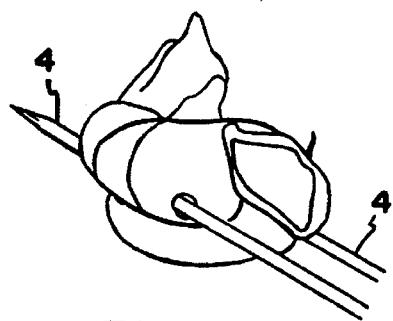

A method for heading the fish-head onto independent steering-pins 4, the fish head being threaded through the eyes and back through the tongues for the purpose of steering the fish through a machine (FIG. 3).

Figure 4:
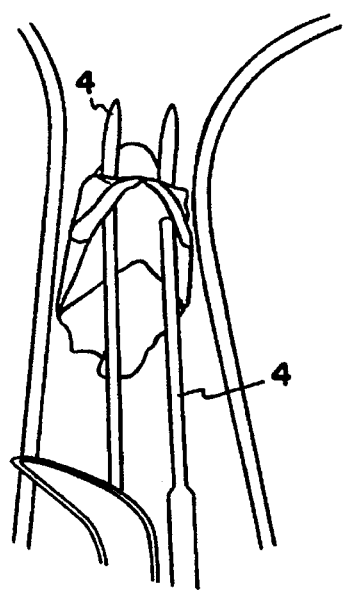

A method of threading a fish-head onto two independent steering-pins 4, the steering-pins being inserted beneath the lower jaw-bone of the fish-head and out through the mount for the purpose of steering the fish through a machine (FIG. 4).

Figure 5:
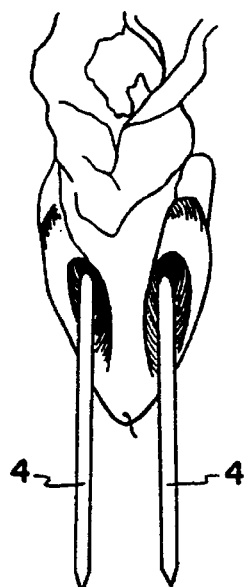

A method of threading a fish-head onto independent steering-pins 4, the fish-head being threaded onto two independent steering-pins alongside the tongue and cross the lower mouth for the purpose of steering a fish through a machine (FIG. 5).

Figure 6:
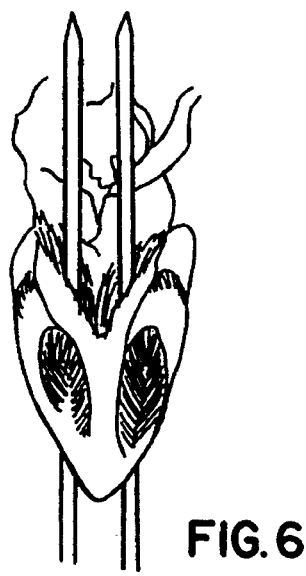

A method of threading a fish-head onto two independent steering-pins 4, the head being threaded onto steering-pins through the mouth and beneath the tongue and out behind the tongue for the purpose of steering the fish through a machine (FIG. 6).

Figure 8:
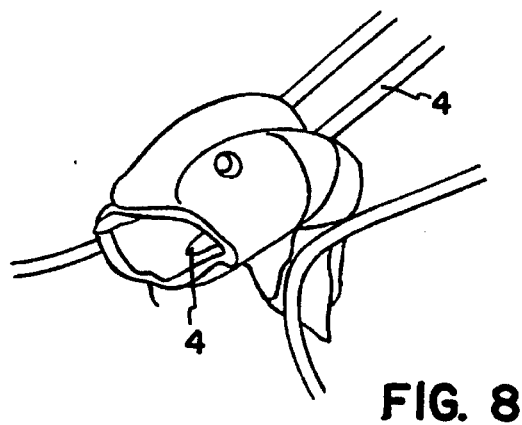
Figure 9:
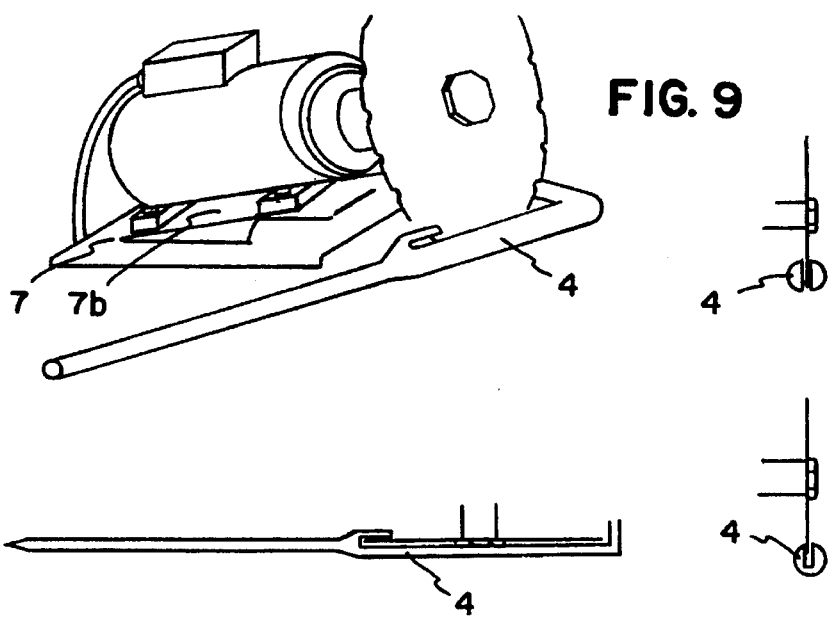
FIGS. 9–13 illustrate cutting means used in the apparatus shown in FIGS. 1 and 2
Figure 10:
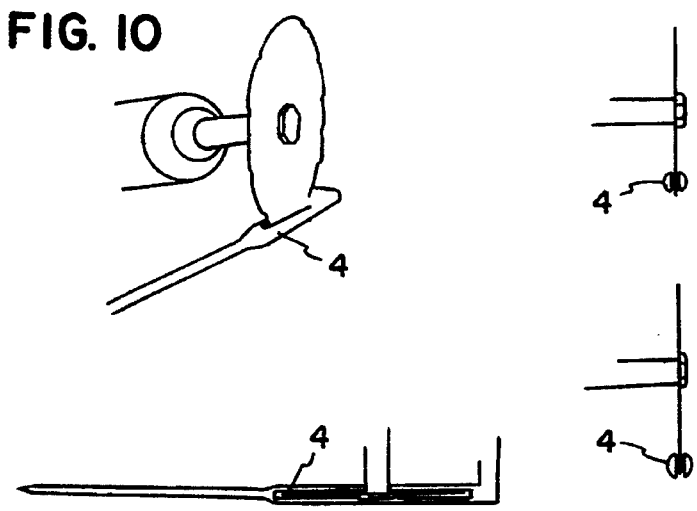

A method of threading a fish-head onto independent steering-pins 4, which are inserted through the head and inside of the cheeks out through the mouth for the purpose of steering the fish through a machine. (FIG. 8)

Figure 7:
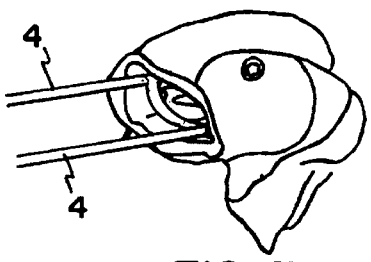

A method of threading a fish-head on to inter-connected steering-pins, the head being threaded through the mouth and out behind the tongue and across square-bones for the purpose of steering the fish through a machine. (FIG. 7)

Guiding or steering-pins 4 preferably made from steel, on which a fish-head may be threaded for the purpose of guiding or steering a fish along a processing line.

The length of such guiding or steering pins 4 may for example range from 5 to 500 centimeters.

The guiding or steering-pins 4 may be provided vis-a-vis knives outside as well as inside the knives and may be positioned above as well as below (FIGS. 9–12).

Figure 27:
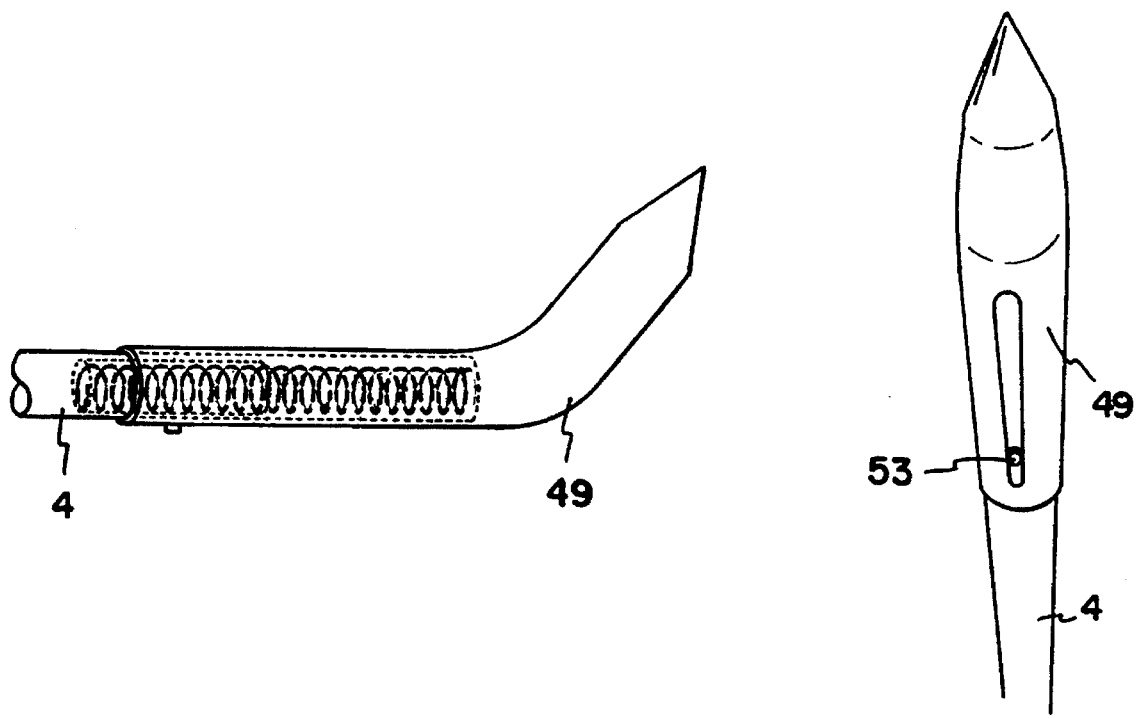

The guiding or steering-pins 4, have displaceably arranged announced thereon, a spring biassing the sleeves towards a foremost position. A stopping member 53 which is attached to the steering-pin 4 prevents the sleeves from coming excessively forward and a wedge in the sleeve into which the stopping member 53 is moved defines how far the sleeve may be mounted onto the steering-pin (FIG. 27).

Figure 11:
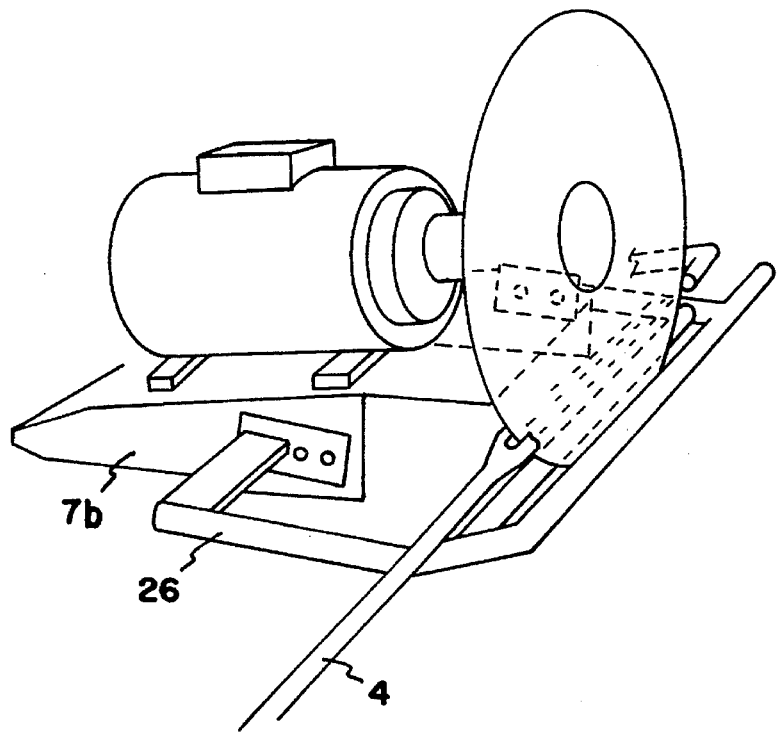
Figure 12:
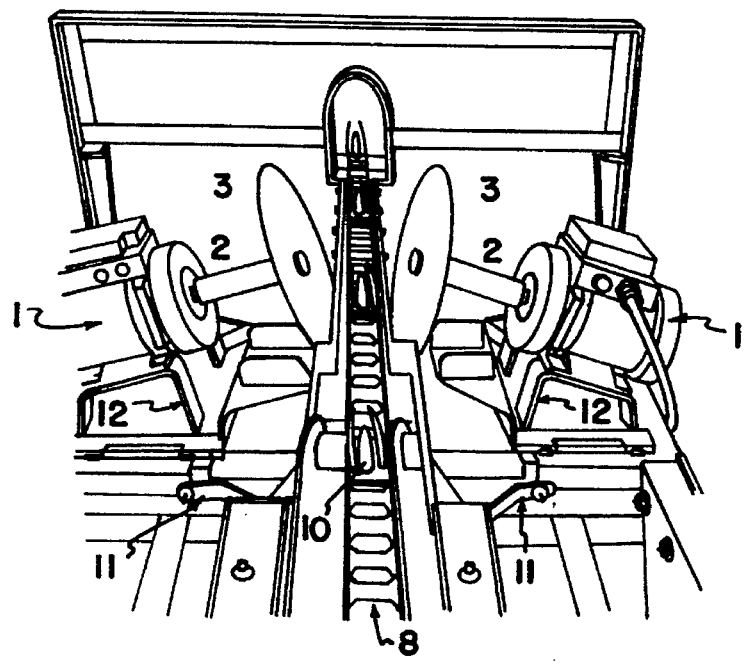
Figure 13:
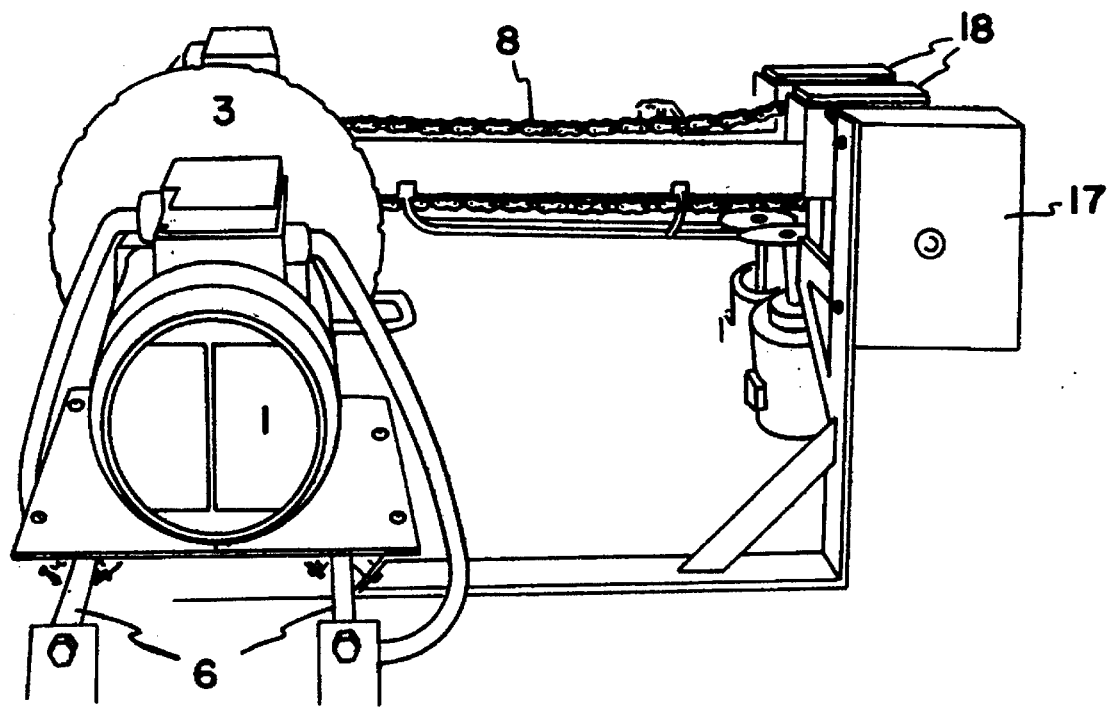
Figure 14:
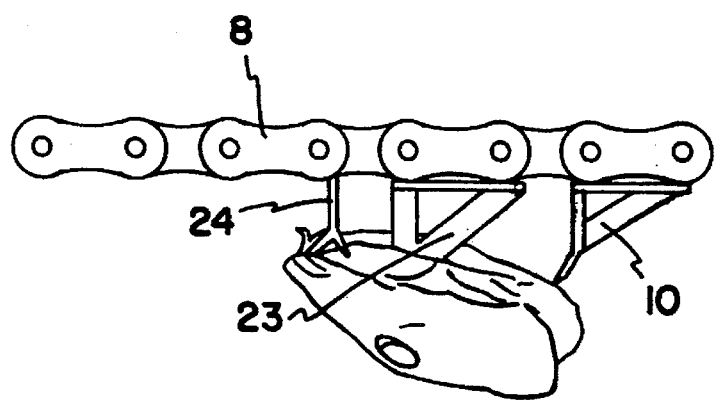
FIGS. 14, 17 and 18 illustrate tongue gripping means mounted on a driving chain for gripping the tongue of a fish head.

A pair of cutting units 3, 4, 5, 6, 8 and 12 each comprising an electric motor i with a shaft having a knife 3 mounted thereon. The cutting units are supported by independent platforms 7 and 7b on which the guide rails or steering-pins 4 are fixed. When one of the guide rails 4 is pressed outwardly or together the entire cutting unit will be moved, and motor levelling arms 11 secure an even movement inwardly toward the center-line of the machine. Therefore, the head of the fish is always cut evenly on both sides, but the shape of the cut may, however, be determined by setting of the knives 3 and guide rails or steering-pins 4 (FIGS. 11–13).

Figure 6A:
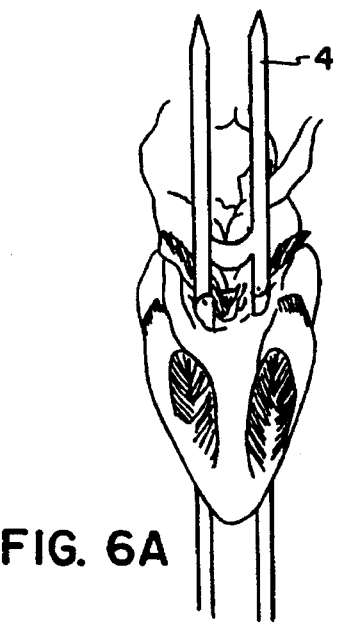

The guide rails or steering-pins 4 may be interconnected (FIGS. 6a and 7).

A method of guiding fish through a machine by using guide rails or steering-pins as described above for guiding the fish during deheading, filleting, flattening and/or evisceration (gutting) (FIGS. 3–8).

A tongue-gripping member 23 and a locking member 24 therefore are adapted to grip the lower jaw-bone with a prick protruding from the locking member, thus pulling the fish forward. A tongue-gripping member may be passed below the tongue of the fish, and locking member 24 then moves upwardly and touches a pin directed forwards. A pair of pins are directed backwards of the locking member 24 and on either side of the tongue-gripping member to hold the tongue firm (FIGS. 14–18, 25 and 28).

Figure 17:
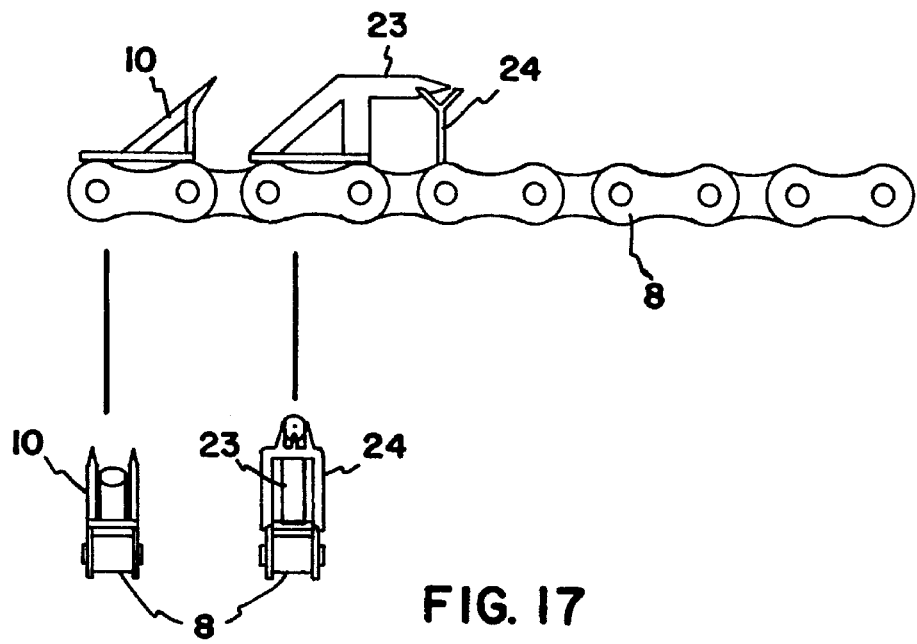
Figure 18:
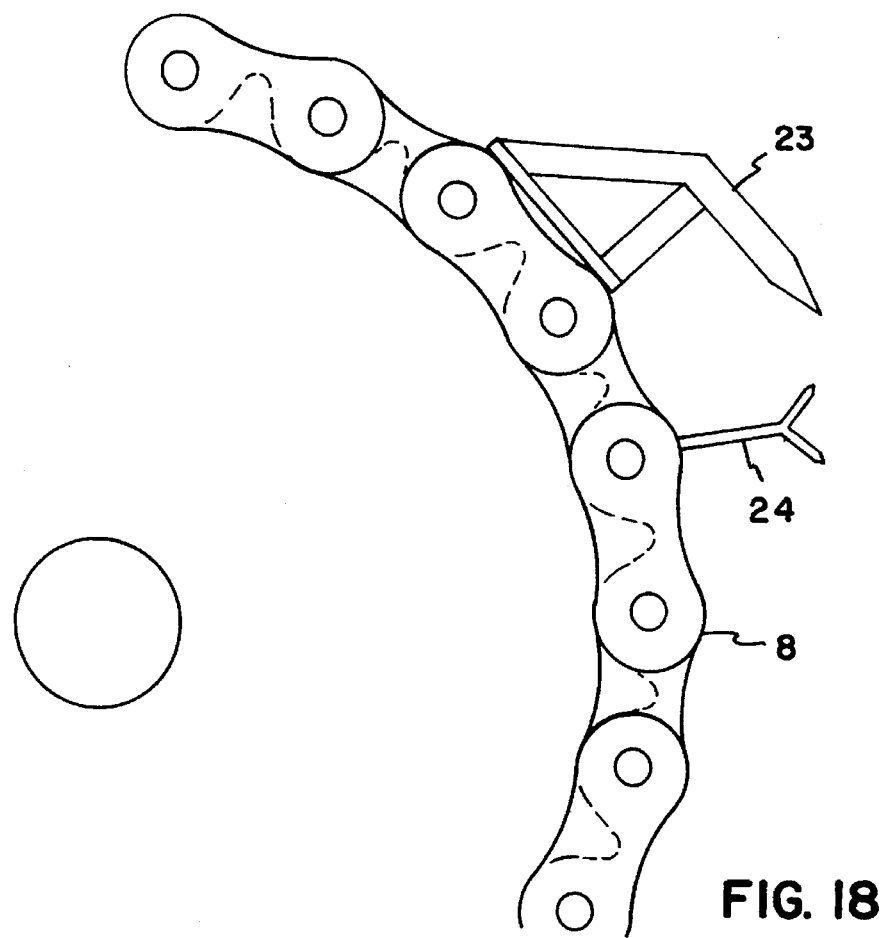
Figure 19:
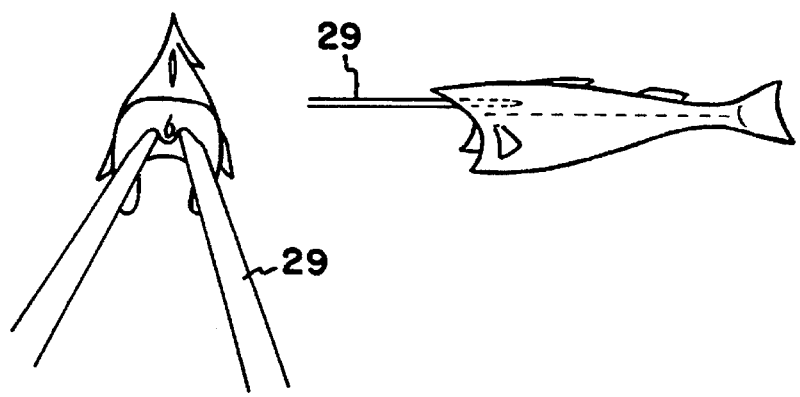
FIGS. 19–22 illustrate filleting of a fish.
Figure 28:
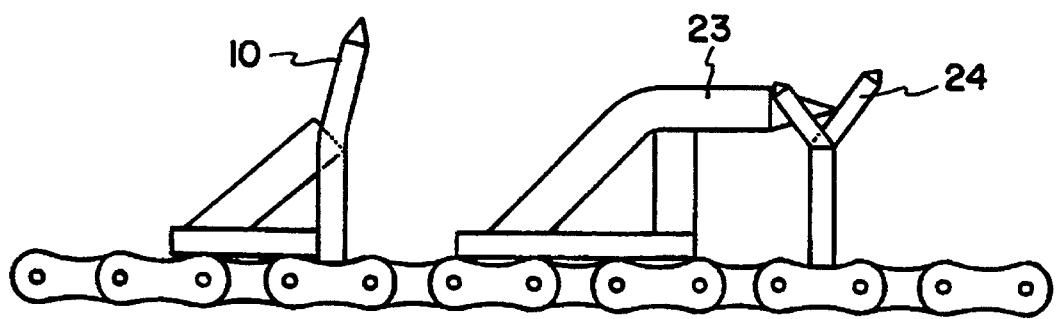
FIG. 28 shows tongue gripping means mounted on a drive chain.

The tongue-gripping member and locking-member described above may be mounted on an endless belt or chain which is passed over a wheel or roller. A spaces defined between the locking-member 24 and the tongue-gripping member 23 when they are passed around the roller or wheel, and this space is being closed when the members are passed along the straight runs of the endless belt. This technique is used to grip the tongue of the fish and to release it again (FIGS. 17, 18 and 28).

Figure 16:
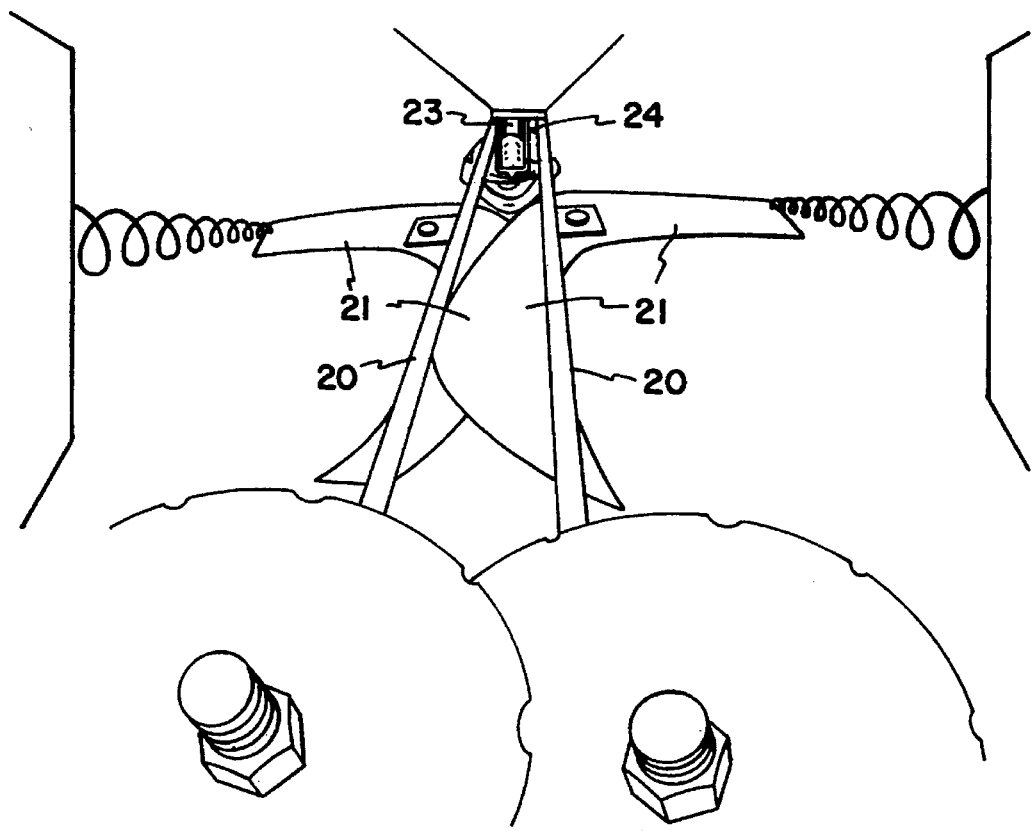

The fish tongue may be held by a tongue-sledge 20 and blades 21 which prevent the mouth-bone from behind the tongue from getting into knives (FIG. 16).

In order to get a tongue in correct position to the knives for removing the tongue the fish may slide along the tongue-sledge 20 to the knives (15, 16, 51 and 52).

A space may be defined between tongue-sledges, and this space may be changes in the range from 1 to 10 cm (FIG. 16).

A method of tongueing and performing a similar operation in fish processing machines in a manner as described above, where the tongue of the fish-head has been gripped by the tongue-gripping member 23 and the locking-member 24. The fish-heads is moved to a knife 36 along a tongue-sledge 20 where a guide-blade 21 keeps down the mouth-bone, mouth-piece, and the bones behind the tongue (FIG. 51). The chain then goes across knives 36 and the tongue is cut away.

Knives 59 are fixed to guide rails or steering-pins 4 for the purpose of opening the muscle forward of the mouth-bone and for detaching the tongue of the fish. When the head is dragged along the guide rails 4 these are positioned closely adjacent to the jaw-bone, the upper jaw, and a cut is then made toward the bone. Thereafter when the knife 59 has entered the head it cuts the tongue fixture due to pressure from the tongues (FIG. 38).

Figure 29:
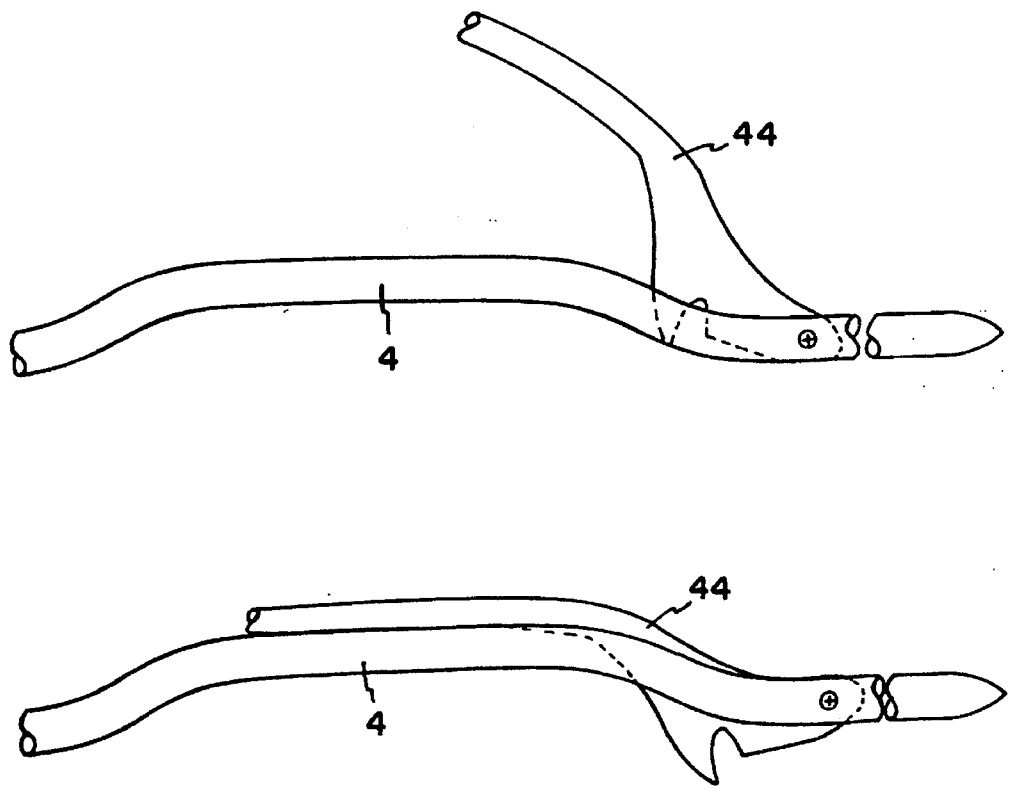
FIG. 29 illustrates eviscerating members moveably mounted on guide rails.

A method to detach tongues and entrails from the body of fish, wherein moving hooks 44 are positioned on guide rails or on steering-pins so that entrails are catch thereby and detached from the head and the fish body (FIG. 29).

A method of pressing down napes prior to cutting by means of special nape-pins 45*a* and 45*b* which are mounted on guide rails or steering-pins 4 so that the nape is pressed down when ploughs 29 are being placed at the nape for filleting, flattening and upon deheading (FIGS. 32, 33, 35, 36, 39 and 40) and when skeleton is being thrust down below the lower ploughs 29 upon flattening.

A method of guiding or steering fish by cutting, either for filleting or flattening, where four ploughs (29*a*, 29), namely two upper and two lower ploughs made of steel, plastic, aluminum or metallic alloy are used. Pins of a material of sufficient strength are threaded together or individually located along the back of a fish (FIGS. 18–22 and 34) so that the lower ploughs 29 enter along the nape and protrude at the tail. The upper ploughs 29 enter alongside the nape and penetrate the flesh at the end of the belly of the fish and protrude at the tail. The fish is dragged forward up onto the ploughs by means of a chain drive.

The ploughs 29 and 29*a* are finger shaped, sharp pointed pine made of steel, plastic, metallic cast pins or another material of sufficient strength. The pins are inserted along the length of the back of a fish as described above with or without a rift along the length of a plough. The shape of ploughs may vary depending on whether the plough is an upper or a lower plough and on the species of fish to be processed. The side of the ploughs which lies against the hollow at the spinal column is determined by the shape of the back in the hollow (FIGS. 34, 44 and 45). The space between the upper plough 29*a* may range from 0,02 to 600 mm and the space between the lower ploughs 29 may range from 0,02 to 600 mm. The length of the ploughs may range from 200 to 1500 mm.

A method of filleting and flattening round fish, wherein cutting knives of the type described above are used for cutting along ploughs 29 and 29*a* (FIGS. 19–22 and 34).

Cutting knives 28 used in filleting and flattening may be located so as to make cuts up to the ploughs as described above from the inside, so that the fillets or the flattened part upon flattening become detached from the length of the back, and the ploughs 29 prevents the knife from going into the bone. Whereas the location of the plough is decided by the thickness of the bones the location of knives always remains the same opposite to the bones, and there is therefore nearly always even and good utilization of the cutting (FIGS. 19–22, 34 and 45)

A method of filleting and flattening fish, whether deheaded or not from the inside by means of pressurized water conducted through ploughs 29 and 29*a* and used to cut the flesh from the bones alongside the length of the back and thereafter alongside the skeleton. The water then flows out alongside the back fins from the lower ploughs 29 out alongside the skeleton and belly fins from the lower ploughs 29*a* and back to the tail in both instances (FIGS. 19–22, 30, 43 and 44)

A method of filleting and of flattening fish, deheaded or not, upper and/or lower ploughs 29*a* and 29 being used together with knives 28 for cutting, so that water passing through the ploughs is used for cutting from the inside as described above and knives 28 are used as also described previously (FIG. 46).

A method of steering the cutting of fish by means of special steering wings (FIGS. 26*a*, 26*b*, 31, 32, 33, 35 and 36) Controlling the way in which the fish is cut (FIGS. 23–26*b*), so that these prevent the fish from lying too low vis-a-vis the knives and prevent the nape pins from pushing the fish too low.

The steering wings 25*a* described above (FIGS. 25*a*, 25*b*, 26*a*, 26*b*, 32, 33, 35 and 50) may be fixed to levelling arms 34 which are shaped in such a manner that when the fish pushes the arms outward the steering wings always maintain the fish in a correct position, different sizes notwithstanding.

A feeding control (FIGS. 25*a*, 25*b*, 35 and 36) having steering wings, i.e. a lower wing 25*b* and an upper wing 25*a* on each side. The lower wing 25*b* keeps the upper wing 25*a* up to the fish and a levelling arm 34 extends from the upper wing 25*a* to a levelling arm bearing 33. The shape of this levelling arm 34 is such that when the fish forces the arms apart due to the size of the fish then there is always maintained a specific pressure on the fish so that in case clubs have been placed on top of the upper steering wings 25*a* these will not go underneath. In case the clubs have been placed underneath these will not go up. By means of this steering it is possible to control whether or not the club will follow with cutting. It is furthermore all the same whether the fish is large or small, the balance existing between the steering wings 25*a* constantly being in complete conformity on both sides of the fish which lies at the blades. The steering blades and steering pins 4 co-operate in keeping the fish always in the centre vis-a-vis the knives. Springs 61 connected to the lower steering-wings 25*b* keep these in and springs 60 linked to the levelling arm 34 play the same part (FIGS. 25*a*, 25*b*, 35 and 36).

Figure 30:
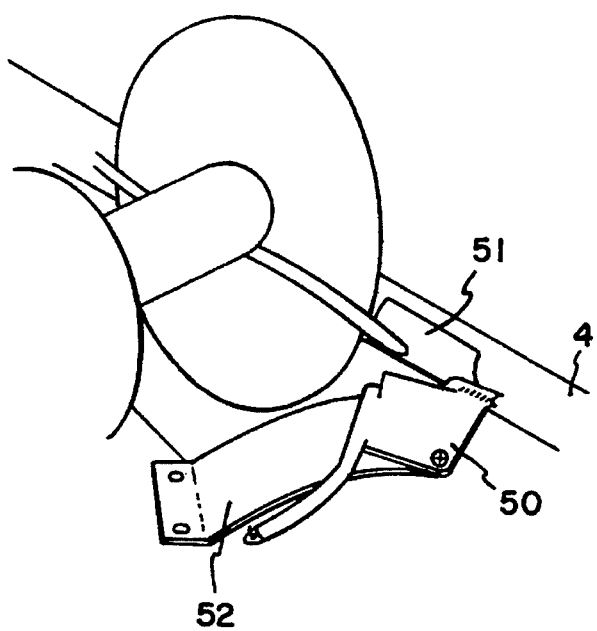
FIG. 30 is a detail showing the location of an eye hook and a muscle pin.

Equipment for cheeking fish, where the fish head is moved along a guide rail or steering pin 4. while an eye hook 50 is hooked into the eye and passes a muscle pin 51 in between the muscle(s) and cheekbone. The cheek muscle is cut way by means of a special knife 3. A holder 52 for the eye hook 50 is fixed to a the motor platform 7, (FIGS. 30 and 38).

A method of cutting cheek muscle away from the head of a fish by means of water cutting.

A flow of water is passed through a muscle pin 51 in order to detach and cut the cheek muscle from the head. In other respects the method may be as described above (FIG. 38).

A method of eviscerating (gutting) fish by means of a special gutting finger 47 which penetrates into the fish between flap-bones (club-bones), while a knife 49 cuts the belly flesh so that the gutting finger keeps the belly flesh of the fish up to the knife. The gutting finger thereupon comes out of the belly flesh at the spawn hole or behind it where the flesh is tightened and thrusts the gutting finger out (FIG. 31).

A method wherein a water flow through the gutting finger(s) 47 is used for eviscerating fish. The belly flesh of the fish may be cut by means of water pressure up through the belly flesh through gutting finger(s). Then the knife 49 is omitted and water pressure entirely caters for the cutting back to the spawn hole or behind it where the flesh tightens (FIG. 31).

Figure 31:
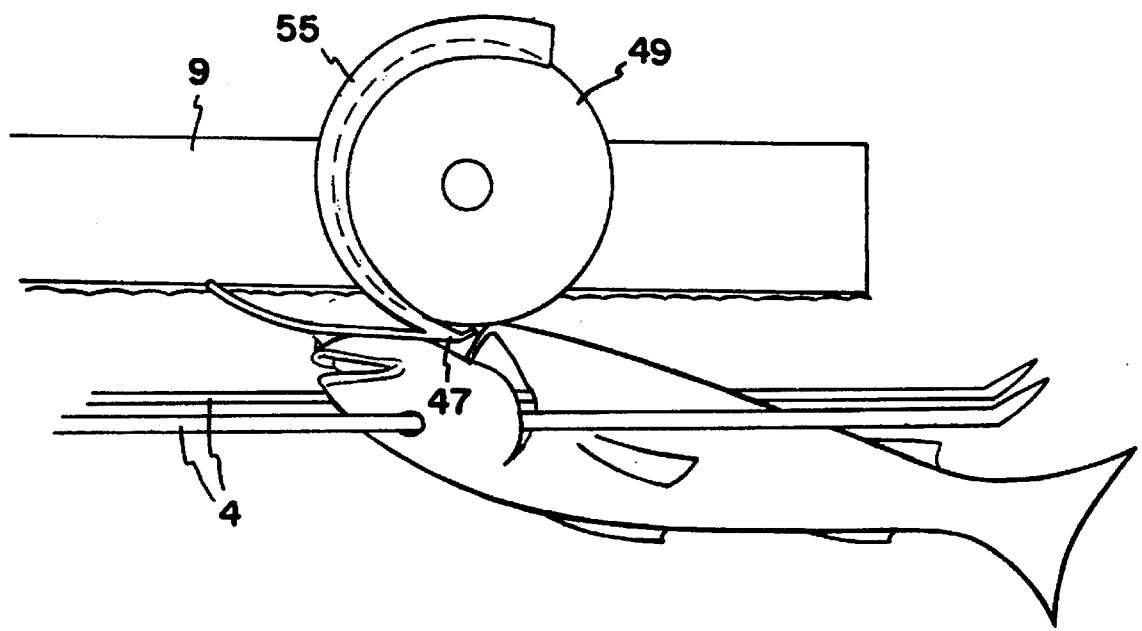
FIG. 31 illustrates cutting of the belly of a fish.

A method of cutting off the belly flesh of a fish as described above where water pressure is employed from the inside (FIG. 31).

A method of cutting on both sides of the ploughs 29 29*a* having longitudinal rifts so that it is possible to let circular cutting knives or knives of any other shape pass through the ploughs an cut on both sides of the ploughs by means of the selfsame cutting device (FIG. 47).

A method of flattening fish by means of a steel loop 68 which is fixed to both the ploughs 29 or 29a and when the ploughs go into the fish, backbones are drawn over the loop which cuts (tears) the bones from the flesh, so that it is not necessary to cut the fish asunder on the side on which the loop is used in order to cut the backbone away from the flesh (FIG. 53). This applies irrespective of whether water cutting or knife cutting is used upon flattening.

I claim:

1. A method of processing fish which are moved through successive fish processing stations located along a predetermined path of movement, said method comprising threading each fish on at least one guide rail or pin defining said predetermined path of movement by inserting a free end part of the guide rail or pin through an eye and through a tongue of the fish.

2. A method according to claim 1, wherein each fish is threaded on a pair of transversely spaced, co-extending guide rails each being inserted through an eye of the fish.

3. A method of processing fish which are moved through successive fish processing stations located along a predetermined path of movement, said method comprising threading each fish on at least one guide rail or pin defining said predetermined path of movement by inserting a free end part of each guide rail through a mouth, beneath a tongue and passing the guide rail out behind the tongue.

4. A method according to claim 3, wherein each fish is threaded on a pair of transversely spaced, co-extending guide rails.

5. A fish processing machine comprising guide means defining a predetermined path, means for moving a fish along said path, the fish processing means being arranged at successive fish processing stations along said path, said guide means comprising at least one guide rail or pin having a free end part adapted to be inserted through a head of the fish, the free end part of each guide rail being moveable longitudinally between extended and retracted positions, biasing means being provided for biasing the free end part towards the extended position.

6. A fish processing machine according to claim 5, wherein the guide means comprises a pair of co-extending, transversely spaced guide rails having a pair of free end parts adapted to be inserted through the fish head.

7. A fish processing machine according to claim 5, wherein the fish processing means comprises eviscerating means, tongue removing means, gill removing means, flattening means, filleting means, cheek muscle detaching means, and/or deheading means.

8. A fish processing machine according to claim 7 wherein the fish processing means comprises plough-like filleting means for cutting fillets from the fish.

9. A fish processing machine according to claim 8 wherein the filleting means comprises a pair of upper and a pair of lower plough-like filleting means of which the upper and lower pairs are adapted to penetrate a flesh at a tail of a passing fish along a neck and along a belly of the fish, respectively.

10. A fish processing machine according to claim 9, wherein the plough-like filleting means comprises finger-shaped, sharp-pointed pins.

11. A fish processing machine according to claim 10 wherein the filleting means further comprises cutting means for cutting the fish along the plough-like filleting means.

12. A fish processing machine according to claim 11, wherein the plough-like filleting means defines nozzles for pressurized liquid to be used for detaching the fillets from bones and/or fins of the fish.

13. A fish processing machine according to claim 12 further comprising detecting means for detecting size of the fish passing and for controlling position of fish processing means, such as cutting means, in relation to the fish.

14. A fish processing machine according to claim 13, wherein the detecting means comprises fish contacting members, which are connected to guide members for maintaining the fish in a correct position.

15. A fish processing machine according to claim 14, wherein the fish processing means further comprises means for removing flesh from the head of the fish, said removing means preferably comprising water cutting means.

16. A fish processing machine according to claim 15, wherein the fish processing means further comprises water cutting means for cutting the belly of the fish.

17. A fish processing machine according to claim 8, wherein at least one of the plough-like filleting means defines a longitudinally extending slot therein for receiving a cutting knife or cutting knives therein.

18. A fish processing machine according to claim 17, wherein a pair of plough-like filleting means are interconnected by a loop-shaped connecting member adapted to embrace a back-bone of the fish being moved in relation thereto along said path, whereby flesh of the fish is separated from the back-bone.

19. A fish processing machine according to claim 18, wherein the fish processing means comprises cutting means, such as rotating knives, positioned adjacent to at least one of the guide rails.

20. A fish processing machine according to claim 19, wherein each cutting means is connected to an associated guide rail, so that position of the cutting means in relation to the associated guide rail may be maintained also when the associated guide rail is flexed or moved.

21. A fish processing machine according to claim 20 wherein the guide rails are interconnected.

22. A fish processing machine according to claim 20 wherein at least one of the guide rails is flexible and/or movably mounted.

23. A fish processing machine according to claim 22 wherein the moving means comprises tongue gripping means for gripping a tongue and a lower jaw bone.

24. A fish processing machine according to claim 23 wherein the tongue gripping means is mounted on an endless chain or belt and comprises a pair of longitudinally spaced members arranged so that they are in a mutually locking position when moved along straight runs of the endless chain or belt and in a releasing position when moved along curved parts of the chain or belt.

25. A fish processing machine according to claim 24 wherein the fish processing means comprises cutting means for cutting away the tongue of the fish.

26. A fish processing machine according to claim 25 wherein the fish processing means comprises an entrails removing member mounted on at least one of the guide rails so as to be pivotable between a position in which the entrails removing member is substantially co-extending with the guide rail, and an entrails removing a position in which the entrails extends transversely from the guide rail.

27. A fish processing machine according to claim 26, further comprising nape supporting means connected to the guide rails at the processing station at which the plough-like filleting means are located, the nape supporting means being adapted to support a nape of the fish at a level slightly below a level of the associated guide rails.

28. A fish processing machine comprising guide means defining a predetermined path, means for moving a fish along said path, fish processing means being arranged at successive fish processing stations along said path, said guide means comprising at least one guide rail or pin having a free end part adapted to be inserted through a head of the fish, the fish processing means comprising plough-like filleting means for cutting fillets from the fish; the plough-like filleting means defining nozzles for pressurized liquid to be used for detaching the fillets from the bones and/or fins of the fish.

29. A fish processing machine according to claim 28, wherein the filleting means comprises a pair of upper and a pair of lower plough-like filleting means of which an upper pair and a lower pair are adapted to penetrate a flesh at a tail of a passing fish along a neck and along a belly of the fish, respectively.

30. A fish processing machine according to claim 29, wherein the plough-like filleting means comprises finger-shaped, sharp-pointed pins.

31. A fish processing machine according to claim 30, wherein the filleting means further comprises cutting means for cutting the fish along the plough-like filleting means.

32. A fish processing machine according to claim 28, further comprising detecting means for detecting a size of the fish passing and for controlling a position of fish processing means, such as cutting means, in relation to the fish.

33. A fish processing machine according to claim 32, wherein the detecting means comprises fish contacting members, which are connected to guide members for maintaining the fish in a correct position.

34. A fish processing machine according to claim 33, wherein the fish processing means further comprises means for removing flesh from a head of the fish, said removing means preferably comprising water cutting means.

35. A fish processing machine according to claim 34, wherein the fish processing means further comprises water cutting means for cutting the belly of the fish.

36. A fish processing machine according to claim 35, wherein at least one of the plough-like filleting means defines a longitudinally extending slot therein for receiving a cutting knife or cutting knives therein.

37. A fish processing machine according to claim 36, wherein a pair of plough-like filleting means are interconnected by a loop-shaped connecting member adapted to embrace a back-bone of the fish being moved in relation thereto along said path, whereby flesh of the fish is separated from the back-bone.

38. A fish processing machine according to claim 37, wherein the fish processing means comprises cutting means, such as rotating knives, positioned adjacent to at least one of the guide rails.

39. A fish processing machine according to claim 38, wherein each cutting means is connected to an associated guide rail, so that a position of the cutting means in relation to the associated guide rail may be maintained also when the associated guide rail is flexed or moved.

40. A fish processing machine according to claim 39, wherein the guide rails are interconnected.

41. A fish processing machine according to claim 40, wherein at least one of the guide rails is flexible and/or moveably mounted.

42. A fish processing machine according to claim 41, wherein the moving means comprises tongue gripping means for gripping a tongue and a lower jaw bone.

43. A fish processing machine according to claim 42, wherein the tongue gripping means are mounted on an endless chain or belt and comprises a pair of longitudinally spaced members arranged so that they are in a mutually locking position when moved along straight runs of the endless chain or belt and in a releasing position when moved along curved parts of the chain or belt.

44. A fish processing machine according to claim 43, wherein the fish processing means comprises cutting means for cutting away the tongue of the fish.

45. A fish processing machine according to claim 44, wherein the fish processing means comprises an entrails removing member mounted on at least one of the guide rails so as to be pivotable between a position in which the entrails removing member is substantially co-extending with the guide rail, and an entrails removing a position in which the entrails extends transversely from the guide rail.

46. A fish processing machine according to claim 45, further comprising nape supporting means connected to the guide rails at the processing station at which the plough-like filleting means are located, the nape supporting means being adapted to support a nape of the fish at a level slightly below a level of the associated guide rails.

\* \* \* \* \*

UNITED STATES PATENT AND TRADEMARK OFFICE
CERTIFICATE OF CORRECTION

PATENT NO. : 5,505,658

DATED : April 9, 1996

INVENTOR(S) : Jón A. Pálmason

It is certified that error appears in the above-identified patent and that said Letters Patent is hereby corrected as shown below:

Column 13 (claim 1), line 19, "a" should be --the--.

Column 14, line 6, insert --a-- after "detecting" (2nd occurrence) and line 7, insert --a-- after "controlling".

Column 14 (claim 20), line 36, insert --a-- after "that".

Column 15 (claim 28), line 8, after the word "through", "a" should be --the--.

Column 16 (claim 45), line 37, after "removing" delete "a".

Signed and Sealed this

Seventeenth Day of September, 1996

*Attest:*

BRUCE LEHMAN

*Attesting Officer*  *Commissioner of Patents and Trademarks*